(12) United States Patent
Ohno et al.

(10) Patent No.: US 8,079,057 B2
(45) Date of Patent: Dec. 13, 2011

(54) BROADCAST RECEIVING APPARATUS AND METHOD OF CONTROLLING THE APPARATUS

(75) Inventors: Tomoyuki Ohno, Zama (JP); Shinya Oda, Kawasaki (JP); Takashi Yamamoto, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 607 days.

(21) Appl. No.: 12/205,491

(22) Filed: Sep. 5, 2008

(65) Prior Publication Data

US 2009/0070849 A1 Mar. 12, 2009

(30) Foreign Application Priority Data

Sep. 7, 2007 (JP) .................................. 2007-233384

(51) Int. Cl.
*H04N 7/173* (2011.01)
(52) U.S. Cl. ........... 725/133; 725/141; 725/78; 709/223
(58) Field of Classification Search .............. 725/37–61, 725/78–85, 131–134, 141–142; 709/217–231
See application file for complete search history.

(56) References Cited

U.S. PATENT DOCUMENTS

| 5,371,553 | A  | * | 12/1994 | Kawamura et al. | ............. | 725/59 |
| 6,240,555 | B1 | * | 5/2001  | Shoff et al.    | ................... | 725/110 |
| 6,282,713 | B1 | * | 8/2001  | Kitsukawa et al. | ............. | 725/36 |
| 6,571,392 | B1 | * | 5/2003  | Zigmond et al.  | ............... | 725/110 |
| 6,987,540 | B2 | * | 1/2006  | Narushima et al. | ........... | 348/552 |
| 7,633,642 | B2 | * | 12/2009 | Shibamiya et al. | .......... | 358/1.15 |
| 7,659,941 | B2 | * | 2/2010  | Narushima et al. | ........... | 348/552 |
| 7,817,301 | B2 | * | 10/2010 | Ohno et al.     | .................. | 358/1.18 |

FOREIGN PATENT DOCUMENTS

JP 2006-126912 5/2006

* cited by examiner

*Primary Examiner* — Annan Shang

(57) ABSTRACT

A broadcast receiving apparatus determines whether a broadcast signal that is being played back and that includes print information is a broadcast signal that is being broadcasted or a broadcast signal that is played back by a recording apparatus. The broadcast receiving apparatus also determines whether the print information included in the broadcast signal that is being played back includes acquisition instructing information instructing acquisition of a print content item transmitted from an external server. If it is determined that the print information included in the broadcast signal that is being played back includes the acquisition instructing information and the broadcast signal that is being played back is played back by the recording apparatus, the broadcast receiving apparatus notifies a user that a print content item which the print information included in the broadcast signal that is being played back intended to acquire during broadcasting cannot possibly be acquired.

20 Claims, 19 Drawing Sheets

FIG. 4A

```
<?xml version="1.0" encoding="EUC-JP"?>
<!DOCTYPE bml PUBLIC "+//ARIB STD-B24:1999//DTD BML Document//JA"
            "http://www.arib.or.jp/B24/DTD/bml_1_1.dtd">
<?bml bml-version="3.0" ?>
<bml>
<head>
<title/>

<style><![CDATA[
  object.btn {
    top:20px; width:30px; height:30px;
  }
  p {
    padding-top:3px; padding-right:3px; padding-bottom:3px; padding-left:3px;
    font-family: round Gothic; font-size:20px; line-height:20px; font-weight:normal;
    letter-spacing:0px; text-align:center;
    background-color-index:8; color-index:7; grayscale-color-index:7 7;
  }
  p.btn {
    top:19px; width:70px; height:30px;
    text-align:left;
  }
  p.menu{
    top:5px; left:1px; width:296px; height:32px;
    font-size:24px; line-height:24px;
  }
  object.menu{
    left:0px; top:0px; width:300px; height:42px;
  }
  div.menu{
    left:5px; width:300px; height:42px;
  }
]]></style>
```

FIG. 4B

```
<script>
<![CDATA[
var printEnable = 0;
var fIndex = 0;
function keydown(){
  var code = document.currentEvent.keyCode;
  if(code == 1) { goUp(); return;}
  if(code == 2) { goDown(); return;}
  if(code == 18){
    browser.Ureg[1] = "'"+fIndex;
    if(fIndex == 0){                                    ← 404
      browser.launchDocument("tenki.bml","cut");
    }
    if(fIndex == 1){                                    ← 405
      browser.launchDocument("traffic.bml","cut");
    }
    if(fIndex == 2){                                    ← 406
      browser.launchDocument("news.bml","cut");
    }
  }
  if(printEnable == 1){
    if(code == 22){                  //R               ← 407
      var ret = browser.printFile("~/0001/weather.htm","/40/0001");
      return;
    }
    if(code == 23){                  //G               ← 408
      var ret = browser.printUri("http://www.bc_broadcast.net/html_print/news.htm");  ← 409
      return;
    }
  }
}
function goDown(){                                      ← 402
  nofocus(fIndex);
  if(++fIndex > 2) {fIndex = 0;}
  focus(fIndex);
}
function goUp(){                                        ← 403
  nofocus(fIndex);
  if(--fIndex < 0) {fIndex = 2;}
  focus(fIndex);
}
function focus(arg){
  fIndex = arg;
  name = "pngPlate" + arg;
  document.getElementById(name).data = 'panel-focus.png';
}
function nofocus(arg){
  name = "pngPlate" + arg;
  document.getElementById(name).data = 'panel.png';
}
function start(){                                       ← 401
  printEnable = browser.getBrowserSupport("ARIB","APIGroup","Print.Basic");
  if(printEnable == 0){
    document.getElementById("pMsg").normalStyle.visibility = "hidden";
    document.getElementById("pngButtonR").normalStyle.visibility = "hidden";
    document.getElementById("pngButtonG").normalStyle.visibility = "hidden";
    document.getElementById("pButtonR").normalStyle.visibility = "hidden";
    document.getElementById("pButtonG").normalStyle.visibility = "hidden";
  }
  else{
    browser.lockModuleOnMemory("~/0001");
  }
  focus(0);
}
]]>
</script>
```

FIG. 4C

```
<bevent>
 <beitem id='bevt0' onoccur='ModuleLocked();' type='ModuleLocked' subscribe='subscribe' module_ref='/40/0001' />
</bevent>

</head>

<body id='Bg' style='background-image:url(background.jpg);' onload='start();'>

<div id='divVideo' style='left:60px; top:40px; width:480px; height:270px;'>
 <object id='objVideo' style='left:0px; top:0px; width:480px; height:270px;'
          data='/-1' type='video/X-arib-mpeg2' remain='remain' />
 <object id='objAudio' type='audio/X-arib-mpeg2-aac' data='/-1' streamstatus='play' />
</div>

<div id='botarea' style='left:70px; top:350px; width:480px; height:250px; background-color-index:8'>
 <object class='btn' id='pngButtonR' style='top:40px;' data='buttonR.png' type='image/X-arib-png' />

<object class='btn' id='pngButtonG' style='top:100px;' data='buttonG.png' type='image/X-arib-png' />

<p class='btn' id='pMsg' style='left:0px; top:0px; width:296px; height:30px;'> Print data exits</p>
 <p class='btn' id='pButtonR' style='left:60px; top:40px; width:296px; height:30px;'>Print weather forecast</p>
 <p class='btn' id='pButtonG' style='left:60px; top:100px; width:296px; height:30px;'>Print latest news</p>

</div>

<div id='Group3' style='left:583px; top:38px; width:310px; height:463px; background-color-index:8'>
 <p id='title' style='left:4px; top:0px; width:300px; height:80px;
          font-size:24px; line-height:24px;
          color-index:3; grayscale-color-index:68 127'>
          BC broadcast station <br/> Data broadcast <br/>
 </p>

<div id='dummy' style='nav-index:0' onkeydown='keydown();' />

<div class='menu' id='divMenu0' style='top:90px;'>
  <object class='menu' id='pngPlate0' data='panel.png' type='image/X-arib-png' />
  <p class='menu' id='pMenu0'>View weather forecast </p>
 </div>
 <div class='menu' id='divMenu1' style='top:180px;'>
  <object class='menu' id='pngPlate1' data='panel.png' type='image/X-arib-png' />
  <p class='menu' id='pMenu1'>View traffic information</p>
 </div>
 <div class='menu' id='divMenu2' style='top:270px;'>
  <object class='menu' id='pngPlate2' data='panel.png' type='image/X-arib-png' />
  <p class='menu' id='pMenu2'>View latest news </p>
 </div>
</div>

</body></bml>
```

```
GET/html_print/news.htm HTTP/1.1
Host:www.xxx.yyy
Accept.text/html
if-Modified-Since: Wed. 25 Jun 2007 21:55:00 JST
User-Agent:dtv/1.3
```

BROADCAST RECEIVING APPARATUS AND METHOD OF CONTROLLING THE APPARATUS

BACKGROUND OF THE INVENTION

1. Field of the Invention

The present invention relates to a broadcast receiving apparatus. More specifically, a broadcast receiving apparatus that receives broadcast signals including print information and a method of controlling the apparatus.

2. Description of the Related Art

Print service for data broadcasts is provided as one type of data broadcast service in digital terrestrial broadcasting. Users of digital televisions (DTVs) having a function of controlling printing apparatuses (for example, printers) connected to the DTVs can use the print service to print print content items, such as information concerning broadcast programs, weather forecast, or news, using the printers. Digital broadcasting standards and operational guidelines concerning the print service are described in, for example, Association of Radio Industries and Businesses Standard "Data Coding and Transmission Specification for Digital Broadcasting" ARIB STD-B24 4.4 and Association of Radio Industries and Businesses Technical Report "Operational Guidelines for Digital Terrestrial Television Broadcasting" ARIB TR-B14 2.7. The ARIB STD-B24 4.4 and ARIB TR-B14 2.7 can be acquired from the Web site of Digital Broadcasting Experts Group. The version numbers that can be acquired from the above site are 5.1 for the ARIB STD-B24 and 2.8 for the ARIB TR-B14 because of revisions of the ARIB standard and technical report. In other words, although the version numbers described in the basic Japanese application are different from those acquired from the above site when the present application is filed, no major difference is found in the description concerning the print service between the ARIB STD-B24 4.4 and the ARIB STD-B24 5.1 and between the ARIB TR-B14 2.7 and ARIB TR-B14 2.8. The following three print modes are applicable to DTVs in the print service conforming to the above documents.

Print mode (1): The DTVs acquire print data included in broadcast waves and request printers to print the print data.

Print mode (2): The DTVs capture data broadcast images that are being displayed and request printers to print the data broadcast images.

Print mode (3): The DTVs request printers to print print data provided in servers on the Internet.

The print mode (1) is realized by printFile( ) or printTemplate( ), which are extension functions DOM-API defined in the above standard and operational guidelines. The printFile( ) is used by a DTV to acquire print data (printfile print data) from a transport stream (TS) resulting from reception and demodulation of a broadcast wave, to transfer the print data to a printer, and to request the printer to print the print data. The DOM-API is an abbreviation of Document Object Model-Application Program Interface.

The print mode (2) is realized by printStaticScreen( ), which is an extension function DOM-API defined in the above standard and operational guidelines.

The print mode (3) is realized by printUri( ), which is an extension function DOM-API defined in the above standard and operational guidelines. The printUri( ) is used by a DTV to cause a printer to acquire print data (printUri print data) indicated by the Uniform Resource Identifier (URI) specified by an argument of the printUri( ) and to request the printer to print the print data.

Apparatuses of determining whether print content items indicated by URIs are tampered when the print content items are printed are known in recent years (for example, refer to Japanese Patent Laid-Open No. 2006-126912). If the print content items are tampered, such apparatuses notify creators of the print content items or print requesters that the print content items are tampered by telephones or electronic mails.

The apparatus disclosed in Japanese Patent Laid-Open No. 2006-126912 adopts the following three methods of determining whether a print content item is tampered.

Determination method (1): Determination using checksum

Determination method (2): Determination based on the final update time of the print content item or generation management information by, for example, a Concurrent Version System (CVS)

Determination method (3): Determination using a watermark message in the print content item The printUri( ) print data generally exists in a content server on the Internet. Accordingly, a recording apparatus, such as a hard disk recorder (HDR), recording the TS records the printfile print data but does not record the printUri print data.

The printUri print data indicated by URIs recorded in the HDR can be deleted from the content server or can be replaced with another printUri print data after the broadcast program ends. Accordingly, the following two error events can occur if a request to print printUri print data is executed while a user is viewing a program recorded in the HDR.

Error event (1): The printing cannot be performed because the printUri print data indicated by a recorded URI is deleted Error event (2): The printUri print data indicated by a recorded URI is replaced with another data and a print content item that is not desired by a broadcasting station or a user is printed If the error event (1) or (2) occurs, problems occur in which the user wastes ink or sheets of paper and it takes excessive time for the printing.

In order to resolve the above problems, the deletion or replacement of the printUri print data by using the technology disclosed in Japanese Patent Laid-Open No. 2006-126912 may be detected. However, the use of the technology disclosed in Japanese Patent Laid-Open No. 2006-126912 can cause problems in which the system is made complicated and the cost is increased in association with the complicated system due to the following three reasons.

Reason (1): when the determination method (1) is used, it is necessary for the recording apparatus to have a function of calculating the checksum of the print content item when a program (that is, a TS) is recorded and holding the checksum in association with the TS.

Reason (2): when the determination method (2) is used, it is necessary to separately provide, for example, the CVS.

Reason (3): when the determination method (3) is used, it is necessary for the recording apparatus to have a function of acquiring a watermark message in the print content item when a program (that is, a TS) is recorded and holding the watermark message in association with the TS.

SUMMARY OF THE INVENTION

In order to resolve the problems described above, it is desirable to provide a technology for reducing the probability of an undesired printing process in a system of acquiring a print content item from an external server to print the print content item while suppressing complication of the system and an increase in the cost in association with the complicated system.

According to an embodiment of the present invention, a broadcast receiving apparatus includes a first receiving unit configured to receive a broadcast signal that is being broadcasted and that includes print information; a second receiving unit configured to receive a broadcast signal that is recorded in a recording apparatus and that includes print information; a playback outputting unit configured to play back the broadcast signal received by the first receiving unit or the second receiving unit to output a video; a reception determining unit configured to determine whether a broadcast signal that is being played back by the playback outputting unit is received by the first receiving unit or the second receiving unit; a print information determining unit configured to determine whether the print information included in the broadcast signal that is being played back includes acquisition instructing information instructing acquisition of a print content item transmitted from an external server; and a notification unit configured to notify a user that a print content item which the print information included in the broadcast signal that is being played back intended to acquire during broadcasting cannot possibly be acquired if the print information determining unit determines that the print information included in the broadcast signal that is being played back includes the acquisition instructing information and the reception determining unit determines that the broadcast signal that is being played back is received by the second receiving unit.

According to another embodiment of the present invention, a method of controlling a broadcast receiving apparatus includes the steps of receiving a broadcast signal that is being broadcasted and that includes print information; receiving a broadcast signal that is recorded in a recording apparatus and that includes print information; playing back the broadcast signal that is being broadcasted and that includes print information or the broadcast signal that is recorded in the recording apparatus and that includes print information to output a video; determining whether a broadcast signal that is being played back is a broadcast signal that is being broadcasted and that includes print information or a broadcast signal that is recorded in the recording apparatus and that includes print information; determining whether the print information included in the broadcast signal that is being played back includes acquisition instructing information instructing acquisition of a print content item transmitted from an external server; and notifying a user that a print content item which the print information included in the broadcast signal that is being played back intended to acquire during broadcasting cannot possibly be acquired if it is determined that the print information included in the broadcast signal that is being played back includes the acquisition instructing information and it is determined that the broadcast signal that is being played back is a broadcast signal that is recorded in the recording apparatus and that includes print information.

Further features of the present invention will become apparent from the following description of exemplary embodiments with reference to the attached drawings.

BRIEF DESCRIPTION OF THE DRAWINGS

FIG. 4A to 4C shows part of an exemplary description of Broadcast Markup Language (BML) data.

DESCRIPTION OF THE EMBODIMENTS

Embodiments of the present invention will herein described in detail in accordance with the attached drawings. The individual embodiments described below will help to understand various concepts from upper concepts to lower concepts of the present invention.

The technical scope of the present invention is defined by the claims and is not restricted by the individual embodiments described below. In addition, all the combinations of features described in the embodiments of the present invention are not necessarily essential to the present invention.

The technologies according to the embodiments of the present invention are applied to television receivers (hereinafter referred to as digital televisions (DTVs)) supporting digital broadcasting (for example, Broadcasting Satellite (BS) digital broadcasting, Communication Satellite (CS) digital broadcasting, or digital terrestrial broadcasting) in the following description. However, for example, the embodiments of the present invention may be applied to DTVs supporting only analog broadcasting (for example, BS analog broadcasting, CS analog broadcasting, or analog terrestrial broadcasting). The embodiments of the present invention may be applied also to broadcast receiving apparatuses, other than the DTVs, in which display apparatuses are integrated with tuners, for example, to recording apparatuses provided with analog or digital television tuners. In this case, users can connect external display apparatuses (for example, DTVs or display monitor apparatuses) to the recording apparatuses to view programs that are broadcasted with the DTVs or the display monitor apparatuses. The DTVs include devices having similar function, for example, include personal computers, set top boxes (STBs), and mobile phones that are provided with television tuners.

First Exemplary Embodiment

Figure 1:
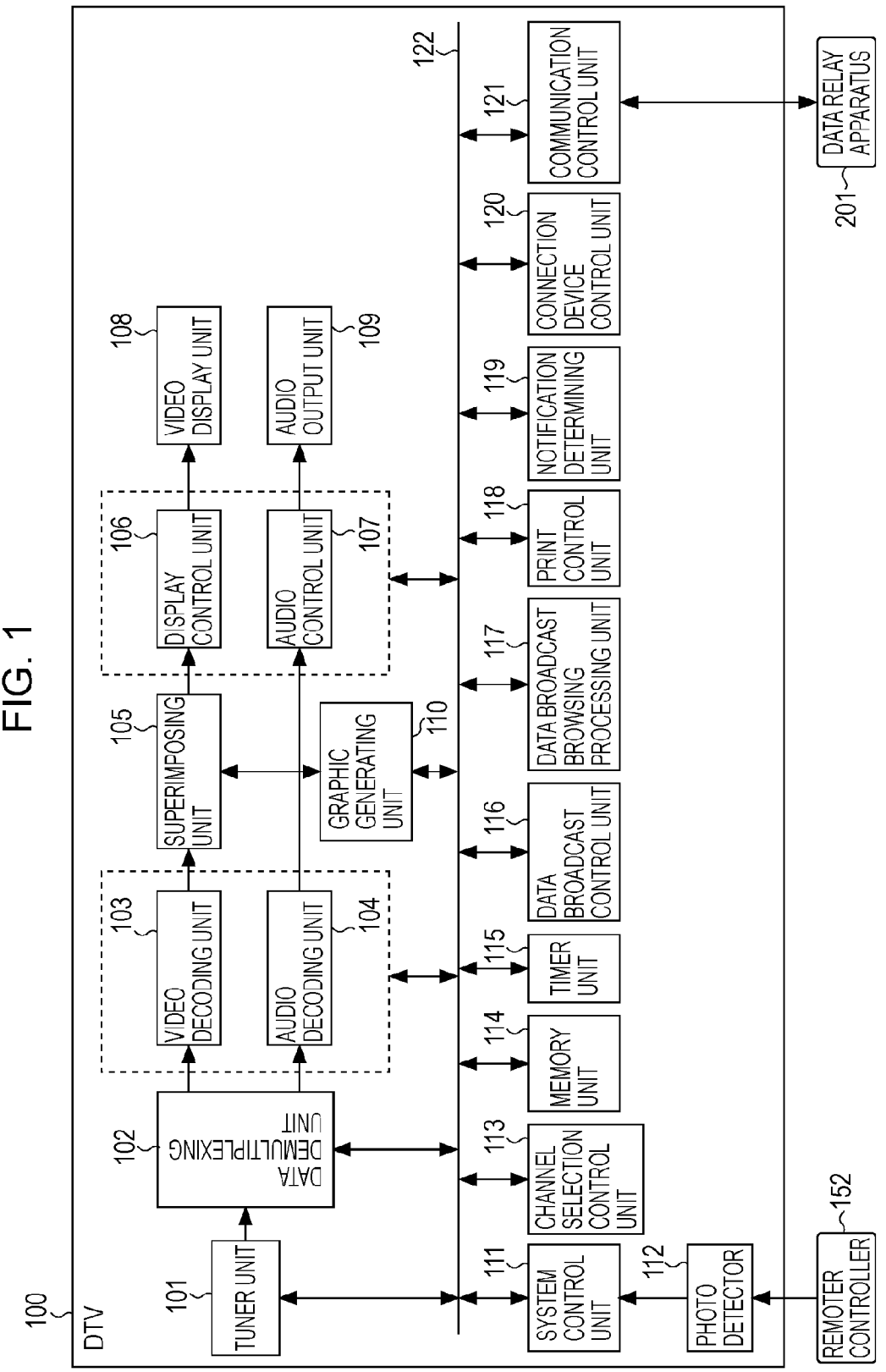
FIG. 1 is a block diagram showing an example of the configuration of a digital television (DTV) according to a first exemplary embodiment of the present invention.
Figure 2:
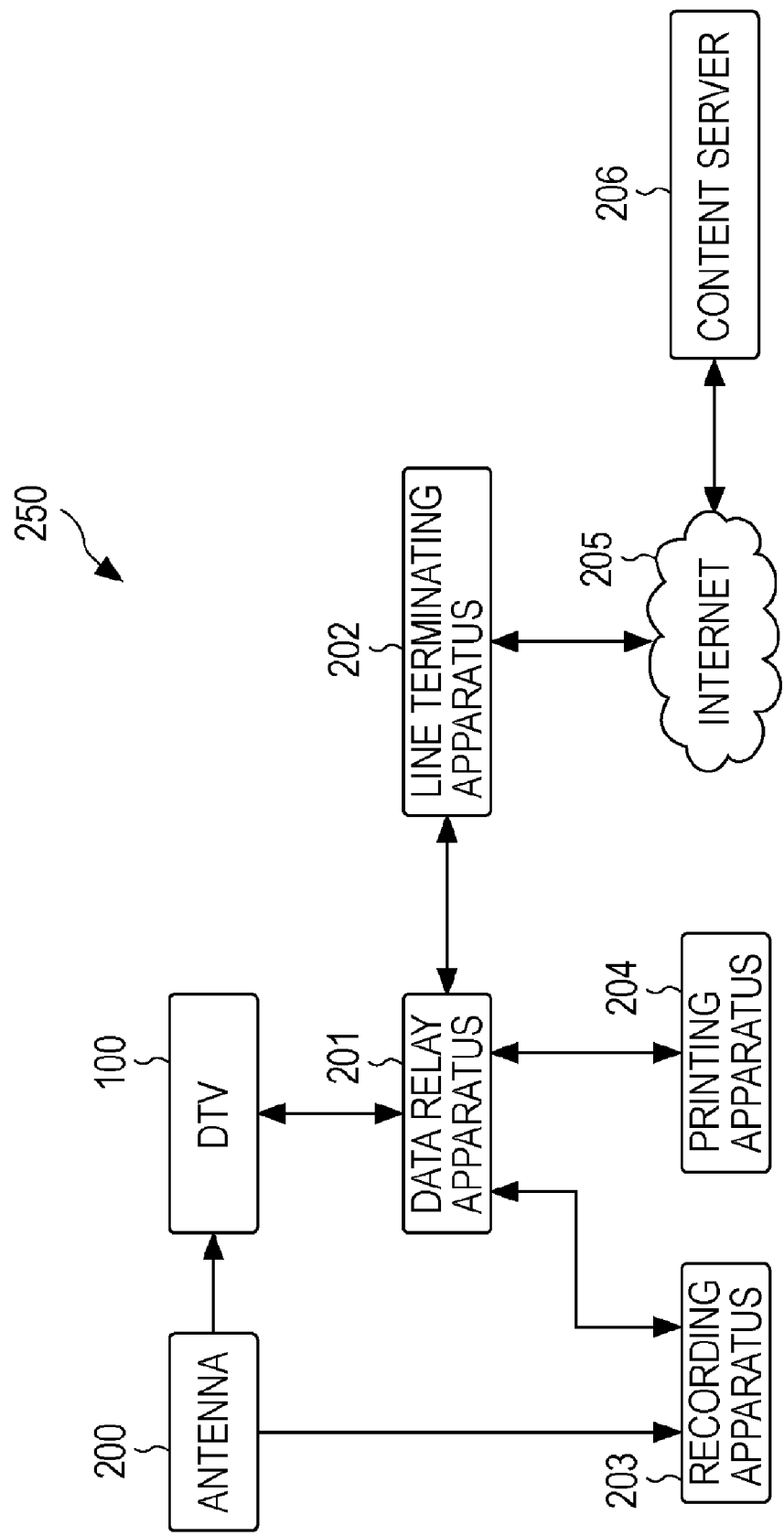
FIG. 2 illustrates an example of the configuration of a print system including the DTV according to the first exemplary embodiment of the present invention.
Figure 3:
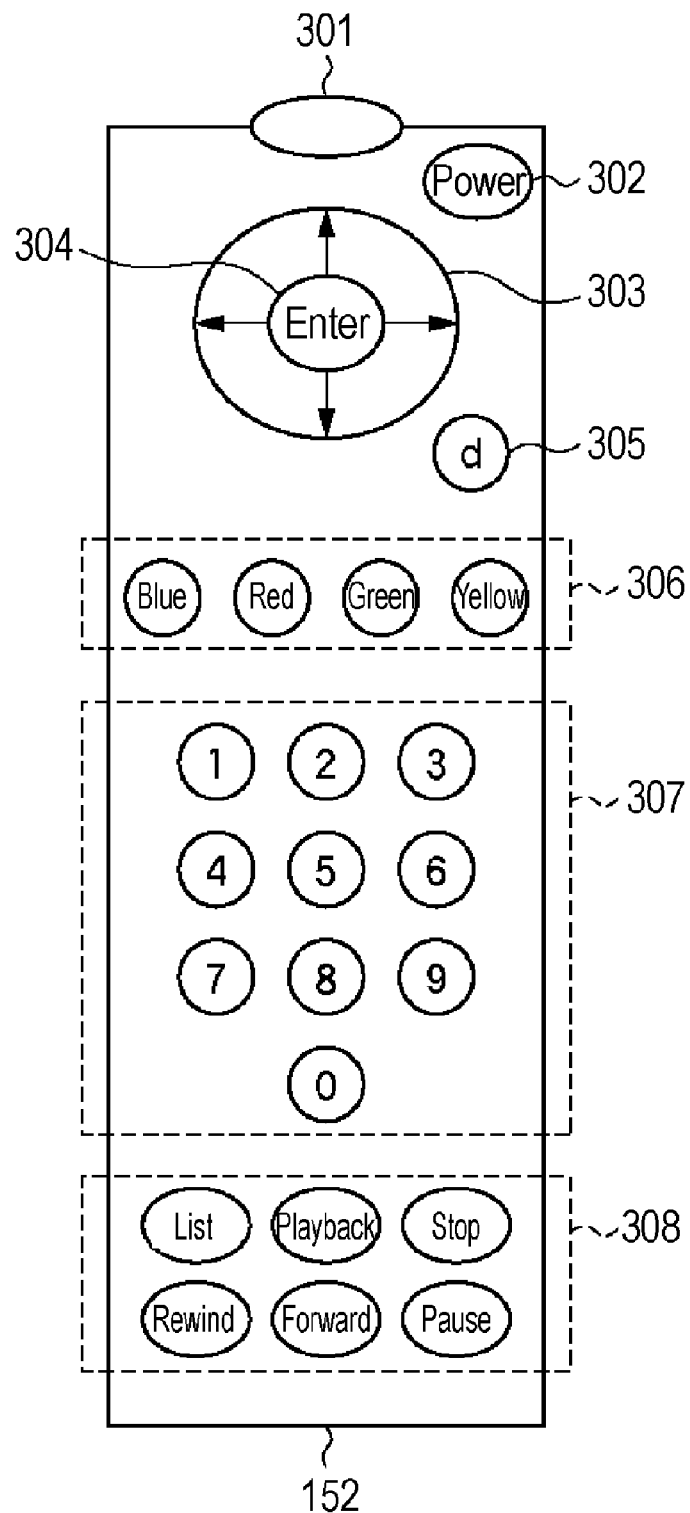
FIG. 3 illustrates an example of the configuration of a remote controller used by a user to operate the DTV according to the first exemplary embodiment of the present invention.

FIG. 1 is a block diagram illustrating an example of the configuration of a DTV 100 according to a first exemplary embodiment of the present invention. FIG. 2 illustrates an example of the configuration of a print system 250 including the DTV 100. FIG. 3 illustrates an example of the configuration of a remote controller 152 used by a user to operate the DTV 100.

The print system 250 will now be described with reference to FIG. 2. The DTV 100 has a function of receiving a broadcast wave (broadcast signal) that is being broadcasted with an antenna 200 as a basic television function (a first receiving unit). The DTV 100 also has a function of receiving a broadcast signal recorded in a recording apparatus 203 through a data relay apparatus 201 (a second receiving unit). The DTV 100 further has a function of playing back and outputting the received broadcast signal (a playback outputting unit). These functions of the DTV 100 allow a user to view a program based on broadcast signals.

The broadcast signal includes data for a data broadcast (data broadcast data), and the data broadcast data includes information for printing (print information). The DTV 100 has a browsing function and a printing function of a data broadcast, defined in the Standard "Data Coding and Transmission Specification for Digital Broadcasting" ARIB STD-B24 4.4 and the Technical Report "Operational Guidelines for Digital Terrestrial Television Broadcasting" ARIB TR-B14 2.7 mentioned above, as television extension functions.

The antenna 200 receives a broadcast signal and transmits the received broadcast signal to the DTV 100 and the recording apparatus 203. The recording apparatus 203 receives the broadcast signal transmitted from the antenna 200 and records a broadcast program (that is, records the broadcast signal). The recording apparatus 203 transmits the recorded broadcast signal to the DTV 100 in response to a request from the DTV 100.

A printing apparatus 204 performs a printing process to form an image on a printing medium, such as a sheet of paper, in response to a request from the DTV 100. The data relay apparatus 201 determines which apparatus data flowing through a network including the DTV 100, the recording apparatus 203, the printing apparatus 204, and a line terminating apparatus 202 is to be transferred to and transfers the data on the basis of the determination result.

The line terminating apparatus 202 realizes connection to the Internet 205 via a connection line, such as an optical fiber, an Asymmetric Digital Subscriber Line (ADSL), or a Community Antenna Television (CATV).

A content server 206, which is an external server, holds print content items described below.

Referring to FIG. 2, the DTV 100, the recording apparatus 203, and the printing apparatus 204 are connected to each other via the data relay apparatus 201 over a Universal Plug and Play (UPnP) network. The UPnP is technical specifications to connect personal computers (PCs), televisions, recording apparatuses, and printing apparatuses to each other in order to provide the functions of any of the apparatuses to the other apparatuses. Control of the recording apparatus 203 and the printing apparatus 204 according to the first exemplary embodiment is realized by transmission and reception of actions and events based on the UPnP technical specifications.

The remote controller 152 will now be described with reference to FIG. 3. Referring to FIG. 3, the remote controller 152 includes a light emitter 301, a power key 302, a cursor key 303, an Enter key 304, and a "d" key 305. The remote controller 152 also includes four color keys 306 including Blue, Red, Green, and Yellow keys and numeric keys 307 including ten keys from "0" to "9". The remote controller 152 further includes recording apparatus control keys 308 including six keys: a List key, a Playback key, a Stop key, a Rewind key, a Forward key, and a Pause key. The keys included in the remote controller 152 in FIG. 3 are only examples. Keys that are not necessary to realize the embodiments of the present invention may be deleted or other keys may be added to the remote controller 152.

The light emitter 301 is used for infrared data communication between the remote controller 152 and a photo detector 112 in the DTV 100. The power key 302 is used to turn on or off the DTV 100.

The recording apparatus control keys 308 are used to control the recording apparatus 203. Of the recording apparatus control keys 308, the List key is used to display a list of recorded programs recorded in the recording apparatus 203 in a video display unit 108 in the DTV 100. A user of the DTV 100 can select a program which the user wants to view with the cursor key 303 and can determine the selected program with the Enter key 304 to start to view the selected program while viewing the display list of programs. The Playback key, the Stop key, the Rewind key, the Forward key, and the Pause key are used for playback control (playback, stop, rewind, forward, and pause) of a recorded program that is being viewed.

The DTV 100 will now be described with reference to FIG. 1.

First, a program viewing function of a television broadcast program of the DTV 100 will now be described. The program viewing function of a television broadcast program is a function of supplying video, audio, and program information concerning a television broadcast program, included in a broadcast signal received with the antenna 200, to the video display unit 108 and an audio output unit 109.

An exemplary internal operation performed by the DTV 100 for a program viewing start process of a television broadcast program will now be described.

A system control unit 111 determines a channel desired by a user on the basis of operational information that concerns an operation of the user with the remote controller 152 and that is received through the photo detector 112 and requests a channel selection control unit 113 to select the channel. The operation is performed by the user with the numeric keys 307 on the remote controller 152.

The channel selection control unit 113 controls a tuner unit 101 and a data demultiplexing unit 102 on the basis of the request for the selection of the channel to select the channel.

The tuner unit 101 performs, for example, demodulation and error correction for the broadcast signal received with the antenna 200, creates a transport stream (TS), and supplies the TS to the data demultiplexing unit 102. Video and audio data about one or more channels, information about the current time, program information, data broadcast data, print data (print information) etc. are multiplexed on the TS.

The current time information includes year, month, date, hour, minute, and second information. The program information includes a program name, a description of the content of the program, a broadcast channel, and information about the broadcasting times (broadcast start time and duration). The data broadcast data and the print data are multiplexed on the TS by a digital storage media-command and control (DSM-CC) data carousel method defined in, for example, International Organization for Standardization (ISO)/International Electrotechnical Commission (IEC) 13818-6 and the Standard "Data Coding and Transmission Specification for Digital Broadcasting" ARIB STD-B24 4.4.

The data demultiplexing unit 102 demultiplexes the video data, the audio data, the program information, the data broadcast data, and the current time information concerning a desired channel from the TS.

The video data demultiplexed by the data demultiplexing unit 102 is supplied to a video decoding unit 103. The video decoding unit 103 performs decoding according to, for example, Moving Picture Experts Group (MPEG) for the video data. The audio data is supplied to an audio decoding unit 104. The audio decoding unit 104 performs decoding according to, for example, the MPEG for the audio data and supplies the audio data to an audio control unit 107. The program information and the data broadcast data is stored in a memory unit 114. The current time information is supplied to a timer unit 115. The timer unit 115 counts time information.

The video data decoded by the video decoding unit 103 is supplied to a display control unit 106 through a superimposing unit 105. The display control unit 106 converts the video data into display data and timing appropriate for the display resolution, the number of displayed colors, and refresh rate of the video display unit 108 and supplies the display data and timing to the video display unit 108.

The superimposing unit 105 has a function of superimposing graphic data generated by a graphic generating unit 110 on the video data decoded by the video decoding unit 103.

The audio control unit 107 has a function of changing, for example, the volume level of the audio data and supplies the audio data to the audio output unit 109.

After the program viewing start process of a television broadcast program described above is successfully completed, the channel selection control unit 113 stores information about the selected channel in the memory unit 114 and notifies the system control unit 111 of the completion of the program viewing start process.

Upon reception of the notification that the program viewing start process is successfully completed from the channel selection control unit 113, the system control unit 111 determines whether a television broadcast program (a program that is being broadcasted) is currently being viewed or a recorded program is currently being viewed to update viewing type information. The viewing type information is stored in the memory unit 114. The viewing type information is updated to "0" when the DTV 100 is turned on or off, to "1" when a television broadcast program is being viewed, and to "2" when a recorded program is being viewed.

Next, a program viewing function of a recorded program of the DTV 100 will now be described. The program viewing function of a recorded program is a function of receiving a broadcast signal recorded in the recording apparatus 203 through the data relay apparatus 201 and supplying video, audio, and program information that concerns the recorded program and that is included in the received broadcast signal to the video display unit 108 and the audio output unit 109.

An exemplary internal operation performed by the DTV 100 for a program viewing start process of a recorded program will now be described.

The system control unit 111 determines a recorded program desired by a user on the basis of operational information that concerns an operation of the user with the remote controller 152 and that is received through the photo detector 112 and requests a connection device control unit 120 to play back the recorded program. The operation is performed by the user with the recording apparatus control keys 308 on the remote controller 152.

The connection device control unit 120 requests the recording apparatus 203 via a communication control unit 121 to transmit a partial transport stream (P-TS) including the desired recorded program in response to the playback request and starts a reception operation. The received P-TS is supplied to the data demultiplexing unit 102 through an internal bus 122. Video and audio data about the program recorded in the recording apparatus 203, program information, data broadcast data, print data, etc. are multiplexed on the P-TS. The program information includes a program name, a description of the content of the program, and information about the broadcasting times (broadcast start time and duration) when the recorded program is broadcasted. The P-TS includes the data broadcast data and the print data multiplexed by the DSM-CC data carousel method defined in, for example, ISO/IEC 13818-6 and the Standard "Data Coding and Transmission Specification for Digital Broadcasting" ARIB STD-B24 4.4.

Since the steps since the P-TS is received in the data demultiplexing unit 102 until the video and audio data is supplied to the video display unit 108 and the audio output unit 109 are similar to the ones in the program viewing start process of a television broadcast program, a description of the steps is omitted herein.

After the program viewing start process of a recorded program described above is successfully completed, the connection device control unit 120 notifies the system control unit 111 of the completion of the program viewing start process.

Upon reception of the notification that the program viewing start process is successfully completed from the connection device control unit 120, the system control unit 111 updates the viewing type information stored in the memory unit 114 to "2" meaning that the recorded program is currently being viewed.

A data broadcast browsing function and a data broadcast printing function of the DTV 100 will now be described. The data broadcast browsing function is a function of supplying video data to the video display unit 108 and supplying audio data to the audio output unit 109 on the basis of the data broadcast data repeatedly multiplexed on the TS or P-TS by the data carousel method. The data broadcast printing function includes the following three functions.

Function (1): A function of acquiring a print content item multiplexed by the data carousel method and causing the printing apparatus 204 to print the print content item Function (2): A function of capturing a data broadcast screen displayed by using the data broadcast browsing function and causing the printing apparatus 204 to print the data broadcast screen Function (3): A function of instructing the printing apparatus 204 to acquire and print a print content item existing in the content server 206 on the Internet The data broadcast data includes text information, display layout information, script information, still image information, and audio information. The text information is described in Broadcast Markup Language (BML) defined in the Standard "Data Coding and Transmission Specification for Digital Broadcasting" ARIB STD-B24 4.4 and the Technical Report "Operational Guidelines for Digital Terrestrial Television Broadcasting" ARIB TR-B14 2.7 mentioned above. The BML is an Extensible Markup language (XML)-based page description language for data broadcasts. The display layout information uses Cascading Style Sheets (CSS) and the script information uses EcmaScript. Document Object Model (DOM) is used as means for accessing and operating the logical structure of the BML and information thereabout.

FIGS. 4A to 4C show part of an exemplary description of BML data. In the exemplary description shown in FIGS. 4A to 4C, a <title> element indicating the name of a document and a <script> element indicating the definition of a script are included in a part surrounded by a <head> tag and a </head> tag. <Object> elements indicating an image, video, and audio are included in a <body> element indicating the body. <Div> elements indicating the areas on the screen and <p> elements indicating sentences, etc. are also included in the <body> element. A style attribute according to the CSS is described in each element to set the coordinate, size, and color of the element when the element is displayed.

An exemplary internal operation performed by the DTV 100 for a data broadcast browsing process and a print request process will now be described with reference to FIGS. 5A to 5C and FIG. 6.

Figure 5A:
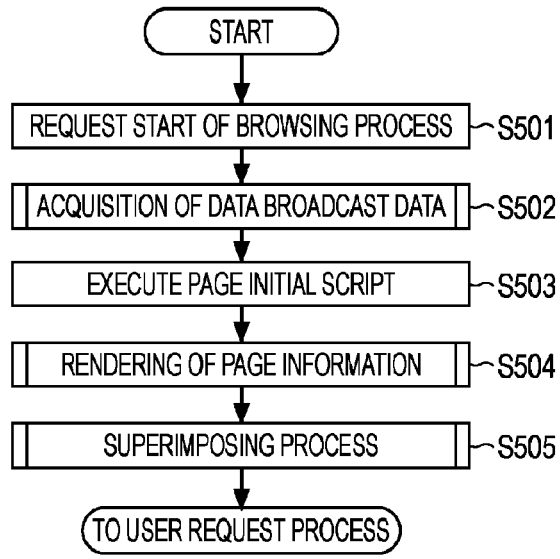
FIG. 5A is a flowchart showing an exemplary initial operation of a data broadcast browsing process.
Figure 5B:
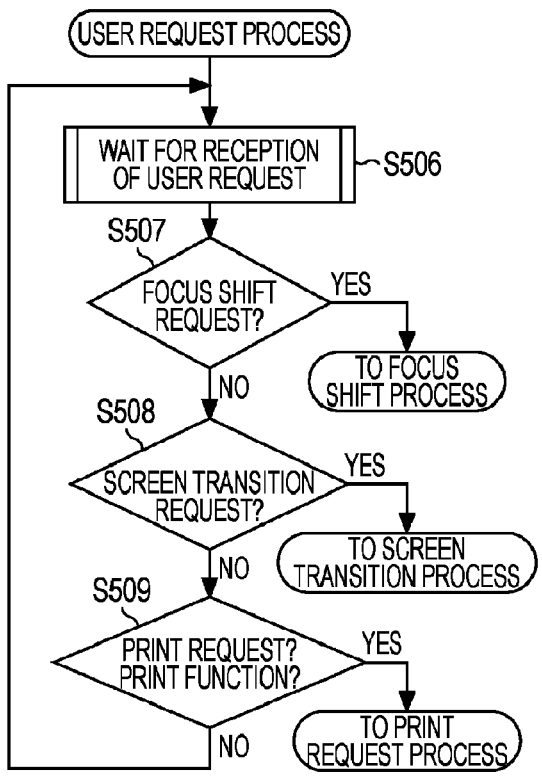
FIG. 5B is a flowchart showing an exemplary operation of a user request process after the initial operation shown in FIG. 5A is completed.
Figure 5C:
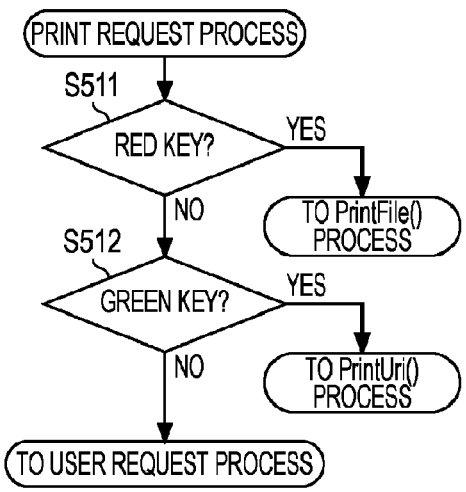
FIG. 5C is a flowchart showing an exemplary operation of a print request process when the user submits a print request.
Figure 6:
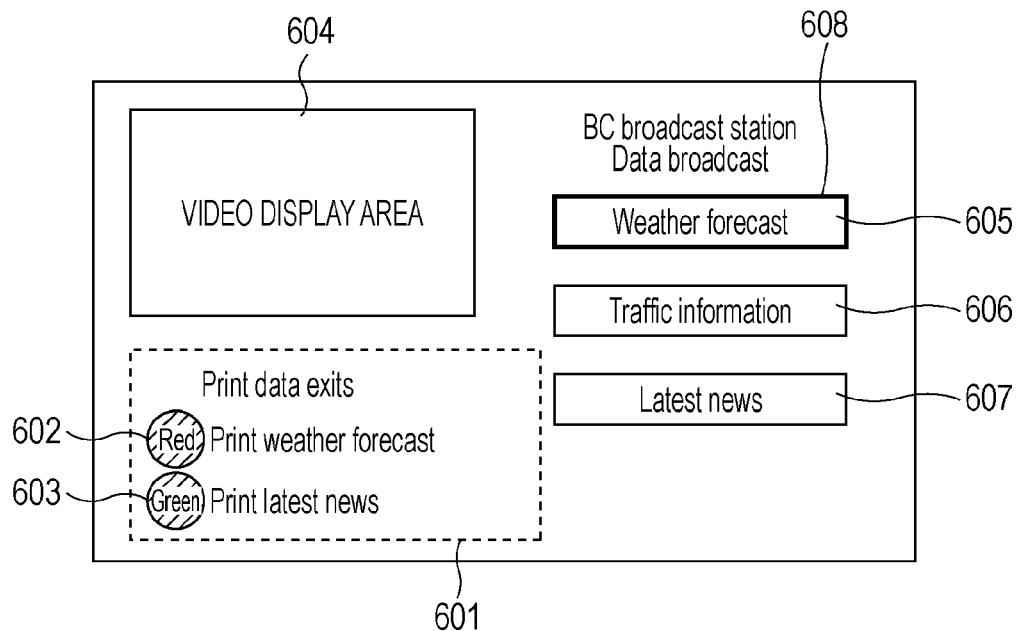
FIG. 6 illustrates a display example when the BML data shown in FIGS. 4A to 4C is displayed in a video display unit.

FIG. 5A is a flowchart showing an exemplary initial operation of the data broadcast browsing process. FIG. 5B is a flowchart showing an exemplary operation of a user request process after the initial operation shown in FIG. 5A is completed. FIG. 5C is a flowchart showing an exemplary operation of the print request process when a user submits a print request. FIG. 6 illustrates a display example when the BML data shown in FIGS. 4A to 4C is displayed in the video display unit 108.

Referring to FIG. 5A, when the system control unit 111 detects reception of a request for the data broadcast browsing process on the basis of the operational information that concerns an operation of the user with the remote controller 152 and that is received through the photo detector 112, then in Step S501, the system control unit 111 requests the data broadcast control unit 116 to start the data broadcast browsing process. The operation is performed by the user with the "d" key 305 on the remote controller 152.

In Step S502, the data broadcast control unit 116 acquires data broadcast data stored in the memory unit 114. If no data necessary for the browsing is stored in the memory unit 114, the data broadcast control unit 116 requests the data demultiplexing unit 102 to acquire data broadcast data. The data broadcast control unit 116 supplies the acquired data broadcast data to a data broadcast browsing processing unit 117 and requests the data broadcast browsing processing unit 117 to perform the data broadcast browsing process.

Figure 7:
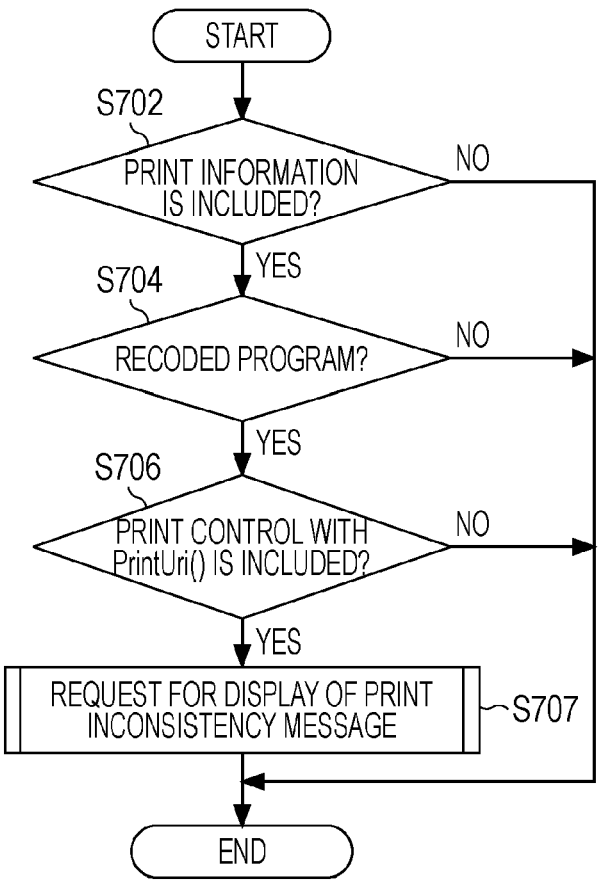
FIG. 7 is a flowchart showing an example of a notification process of a print inconsistency message, according to the first exemplary embodiment of the present invention.

When Step S502 is completed, a notification process of a print inconsistency message described below with reference to FIG. 7 is started in parallel with the initial operation of the data broadcast browsing process.

In Step S503, the data broadcast browsing processing unit 117 executes a script function described in an Onload attribute in the <body> tag in the BML data included in the acquired data broadcast data as an initial script. In the exemplary BML data shown in FIGS. 4A to 4C, a start( ) function denoted by reference numeral 401 corresponds to the initial script.

In the start( ) function, first, a function capable of inquiring whether the DTV 100 has the printing function is invoked. The data broadcast browsing processing unit 117 has an extension function DOM-API, getBrowserSupport( ), as a built-in function API invoked from the script. The getBrowserSupport( ) returns "1" or "0" when a string ("ARIB", "APIGroup", "Print.Basic") is specified as an argument. The value "1" means that the DTV 100 has the printing function and the value "0" means that the DTV 100 does not have the printing function. Since the DTV 100 according to the first exemplary embodiment has the printing function, this API returns "1".

When the data broadcast browsing processing unit 117 executes the getBrowserSupport( ) including the argument ("ARIB", "APIGroup", "Print.Basic"), the data broadcast browsing processing unit 117 stores the return value "1" in the memory unit 114 as printing function query history information. The return value "0" is stored in the memory unit 114 as the printing function query history information by the system control unit 111 when the program viewing start process of a television broadcast program and the program viewing start process of a recorded program are started.

In the start( ) function, next, it is determined whether button images and text information are rendered in an area 601 in FIG. 6 on the basis of the return value of the getBrowserSupport( ) function. If the return value of the getBrowserSupport( ) function is "1", that is, the DTV 100 has the printing function, the button images and text information are rendered in the area 601. Conversely, if the return value of the getBrowserSupport( ) function is "0", that is, the DTV 100 does not have the printing function, the button images and text information are not rendered in the area 601.

After executing the initial script, then in Step S504, the data broadcast browsing processing unit 117 renders the button images and text information via the graphic generating unit 110 and the superimposing unit 105.

As shown in the right side in FIG. 6, the graphic generating unit 110 renders a weather forecast button 605, a traffic information button 606, and a latest news button 607 used for display transition to detailed information, such as weather forecast information and the traffic information. A weather forecast print button 602 used for printing the weather forecast information and a latest news print button 603 used for printing the latest news information are rendered in the area 601. The weather forecast print button 602 is a circular red button and corresponds to the Red key in the color keys 306. The latest news print button 603 is a circular green button and corresponds to the Green key in the color keys 306.

In Step S505, the data broadcast browsing processing unit 117 requests the superimposing unit 105 to superimpose the button image and text information on a video supplied from the video decoding unit 103. Referring to FIG. 6, a video decoded by the video decoding unit 103 is displayed in an area 604.

After the initial operation of the data broadcast browsing process is completed, the data broadcast browsing processing unit 117 notifies the data broadcast control unit 116 that the initial operation of the data broadcast browsing process is completed and shifts to the user request process shown in FIG. 5B. The notification that the initial operation of the data broadcast browsing process is completed is also supplied to the system control unit 111 via the data broadcast control unit 116.

Referring to FIG. 5B, in Step S506, the data broadcast browsing processing unit 117 waits for reception of any user request input with the remote controller 152 while the screen shown in FIG. 6 is being displayed. When a user request is received, in Steps S507 to S509, the data broadcast browsing processing unit 117 determines the type of the user request.

For example, the user can operate the cursor key 303 on the remote controller 152 to shift a focus 608 to a desired position (any of the weather forecast button 605, the traffic information button 606, and the latest news button 607). The user can press the Enter key 304 on the remote controller 152 to perform a transition process of the data broadcast display screen. The user can press the Red key or the Green key in the color keys 306 on the remote controller 152 to perform the print request process.

In Step S507, the data broadcast browsing processing unit 117 determines whether the received user request is a focus shift request by an operation with the cursor key 303. If the received user request is the focus shift request, a focus shift process is performed in accordance with the description of the BML data (the focus shift process is not illustrated in detail). In the exemplary description shown in FIGS. 4A to 4C, goDown( ) denoted by reference numeral 402 and goUp( ) denoted by reference numeral 403 correspond to focus shift processing functions. When the focus shift process is completed, the user request process is started again. If the received user request is not the focus shift request, the process goes to Step S508.

In Step S508, the data broadcast browsing processing unit 117 determines whether the received user request is a screen transition request by an operation with the Enter key 304. If the received user request is the screen transition request, a screen transition process is performed in accordance with the description of the BML data (the screen transition process is not illustrated in detail). In the exemplary description shown in FIGS. 4A to 4C, launchDocument( ) functions denoted by reference numerals 404 to 406 correspond to screen transition processing functions. When the screen transition process is completed, the user request process is started again. If the received user request is not the screen transition request, the process goes to Step S509.

In Step S509, the data broadcast browsing processing unit 117 determines whether the received request is a print request by an operation with the color keys 306. The data broadcast browsing processing unit 117 also determines whether the DTV 100 has the printing function on the basis of the printing function query history information held in the memory unit 114. If the print request is not received or the printing function query history information is set to "0", the process goes back to Step S506 to repeat the user request process. If the print request is received and the printing function query history information is set to "1", the print request process shown in FIG. 5C is performed.

Referring to FIG. 5C, in Step S511, the data broadcast browsing processing unit 117 determines whether the Red key in the color keys 306 is pressed. If the Red key is not pressed, the process goes to Step S512. If the Red key is pressed, the data broadcast browsing processing unit 117 requests a print control unit 118 to perform a printing process in accordance with the description of the BML data (a printFile( ) function denoted by reference numeral 407 in the exemplary description shown in FIGS. 4A to 4C).

In Step S512, the data broadcast browsing processing unit 117 determines whether the Green key in the color keys 306 is pressed. If the Green key is not pressed, the process goes to Step S506 to repeat the user request process. If the Green key is pressed, the data broadcast browsing processing unit 117 requests the print control unit 118 to perform a printing process in accordance with the description of the BML data (a printUri( ) function denoted by reference numeral 408 in the exemplary description shown in FIGS. 4A to 4C).

According to the first exemplary embodiment of the present invention, the data broadcast data includes information related to printing (print information), and the print information includes information (acquisition instructing information) instructing acquisition of a print content item from an external server, denoted by the reference numeral 408. The acquisition instruction information includes a URI 409. It is assumed that the URI 409 denotes a print content item existing in the content server 206.

As described above, when the printUri( ) function is executed on the basis of the BML data about a recorded program, the print content item indicated by the URI can be deleted or replaced with another data. Performing the printing process based on the print content item that is deleted or replaced with another data can lead to waste of time, ink, and/or a printing medium.

Accordingly, according to the first exemplary embodiment of the present invention, a notification determining unit 119 determines whether it is necessary to notify the user that a print content item which the print information intended to acquire during the broadcasting cannot possibly be acquired and gives notification to the user, if needed. This notification is called the print inconsistency message. According to the first exemplary embodiment, the print inconsistency message is a text message superimposed on a video displayed in the video display unit 108 by the display control unit 106. However, the print inconsistency message is not limited to the text message and may be an audio message output from the audio output unit 109.

FIG. 7 is a flowchart showing an example of the notification process of the print inconsistency message. As described above, the notification process in FIG. 7 is started in parallel with the processes shown in FIGS. 5A to 5C after Step S502 in FIG. 5 is finished.

Referring to FIG. 7, in Step S702, the notification determining unit 119 determines whether print information is included in the data broadcast data that is currently being browsed. This determination is based on, for example, determination of whether an invocation of a function starting with "browser.print" is included in the BML data that is currently being browsed. If print information is included in the data broadcast data that is currently being browsed, the process goes to Step S704. Otherwise, the notification process is terminated.

In Step S704, the notification determining unit 119 determines whether the type of a program that is currently being viewed is a recorded program on the basis of the viewing type information held in the memory unit 114. Specifically, the notification determining unit 119 determines whether the broadcast signal that is being played back is a broadcast signal that is being broadcasted or a broadcast signal recorded in the recording apparatus 203 (a reception determining unit). If the viewing type information is set to "2" meaning that the recorded program is being viewed, the process goes to Step S706. Otherwise, the notification process is terminated.

In Step S706, the notification determining unit 119 determines whether the print information included in the data broadcast data that is currently being browsed includes information (acquisition instructing information) instructing acquisition of a print content item from an external server (for example, the content server 206) (a print information determining unit). Specifically, according to the first exemplary embodiment, the notification determining unit 119 determines whether the BML data that is currently being browsed includes the printUri( ) function. If the BML data that is currently being browsed includes the printUri( ) function, the process goes to Step S707. Otherwise, the notification process is terminated. The function included in the BML data that is currently being browsed is not limited to the printUri( ) function and, if any information instructing acquisition of a print content item from an external server is included in the BML data that is currently being browsed, the process goes to Step S707.

In Step S707, the notification determining unit 119 requests the graphic generating unit 110 to perform a print inconsistency message display process. The graphic generating unit 110 generates graphic data to be displayed on a "print inconsistency message" screen in response to the request from the notification determining unit 119, and the generated graphic data is displayed in the video display unit 108 via the superimposing unit 105 and the display control unit 106. In other words, the print inconsistency message is superimposed on the video output from the display control unit 106.

Figure 8:
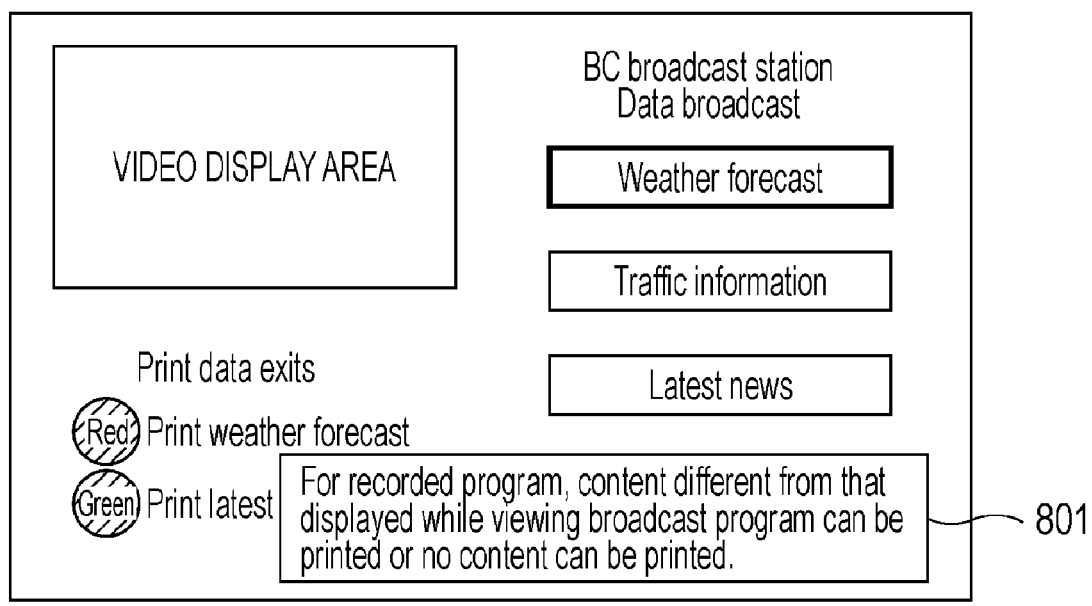
FIG. 8 illustrates an example of the print inconsistency message displayed along with a data broadcast screen displayed in the video display unit in the DTV according to the first exemplary embodiment of the present invention.

FIG. 8 illustrates an example of the print inconsistency message displayed along with the data broadcast screen displayed in the video display unit 108. The user can view a print inconsistency message 801 to recognize that the print content item that is intended to acquire when the print request is submitted cannot possibly be acquired.

As described above, according to the first exemplary embodiment, if the broadcast signal that is being played back by the DTV 100 is recorded in the recording apparatus 203 and the print information included in the broadcast signal includes the information instructing acquisition of a print content item from an external server, the DTV 100 gives notification. This notification indicates that the print content item which the print information included in the broadcast signal that is being played back intended to acquire during the broadcasting cannot possibly be acquired.

Consequently, since the user can recognize that the print content item that is intended to acquire cannot possibly be acquired before the user submits the print request, the probability of performing an undesired printing process is reduced. Accordingly, it is possible to suppress the waste of time, ink, and/or a printing medium.

Second Exemplary Embodiment

According to a second exemplary embodiment of the present invention, the DTV 100 does not display the print inconsistency message when the print content item supplied from an external server is not deleted or replaced with another data, unlike the first exemplary embodiment. The second exemplary embodiment will now be described with reference to FIGS. 9 to 11.

Since the configurations of the DTV 100, the print system 250, and the remote controller 152 according to the second exemplary embodiment are the same as the ones according to the first exemplary embodiment, a description of the configurations is omitted herein (refer to FIGS. 1 to 3).

Figure 9:
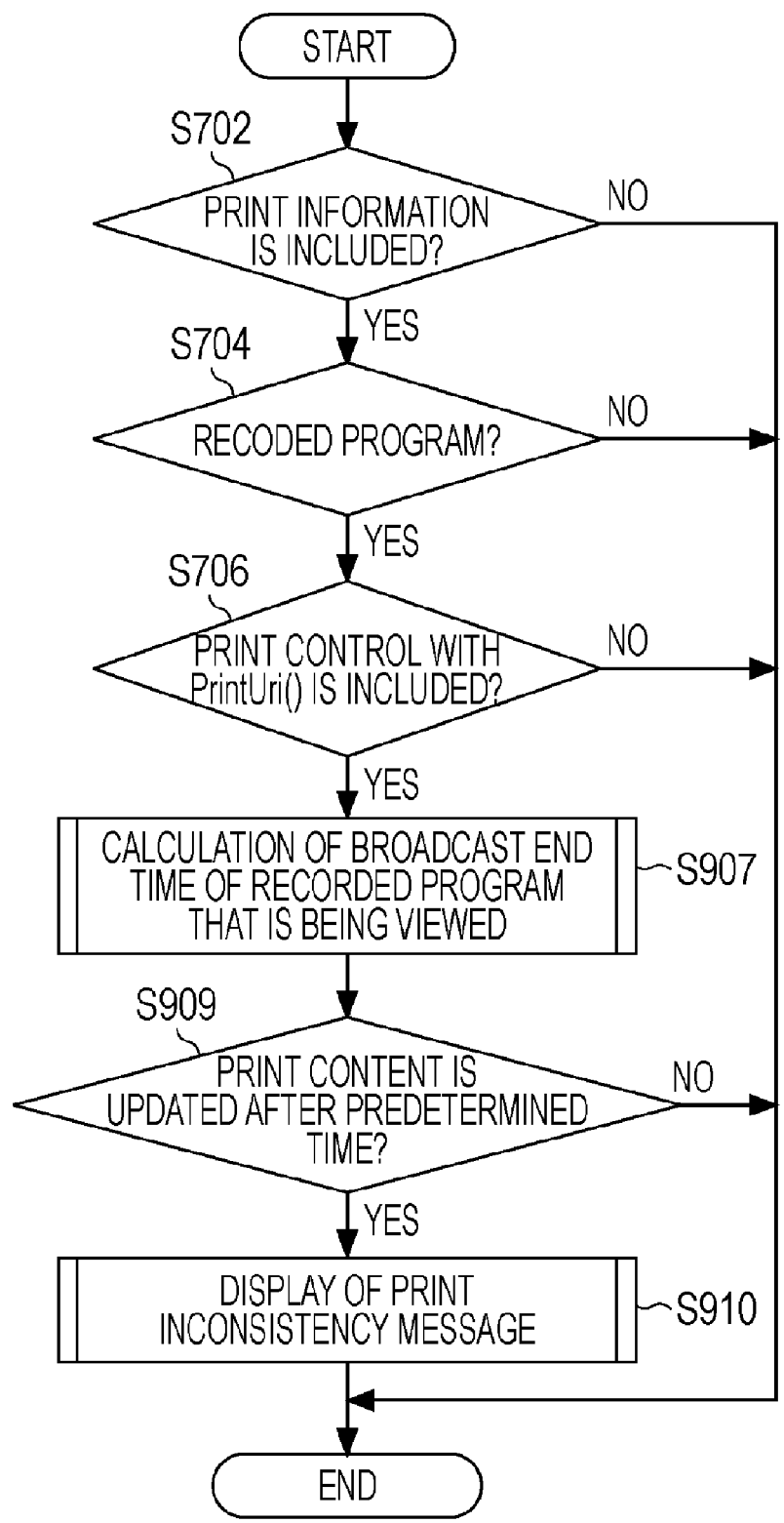
FIG. 9 is a flowchart showing an example of a notification process of the print inconsistency message, according to a second exemplary embodiment of the present invention.

FIG. 9 is a flowchart showing an example a notification process of the print inconsistency message according to the second exemplary embodiment. The notification process in FIG. 9 is started in parallel with the processes shown in FIGS. 5A to 5C after Step S502 in FIG. 5 is finished. The same reference numerals are used in FIG. 9 to identify the same steps shown in FIG. 7 and a description of such steps is omitted herein.

Referring to FIG. 9, in Step S907, the notification determining unit 119 acquires information about broadcasting times (broadcast start time and duration) when the recorded program is broadcasted, included in the program information acquired from the P-TS, through the connection device control unit 120. For example, the broadcasting time information can be acquired from a partial transport time descriptor in a Selection Information Table (SIT) included in the P-TS. Then, the notification determining unit 119 calculates the broadcast end time of the recorded program that is being viewed on the basis of the information about the broadcast start time and the duration.

In Step S909, the notification determining unit 119 determines whether the print content item corresponding to the URI indicated by the printUri( ) function included in the print information is updated after a predetermined time (in the notification process in FIG. 9, after the time calculated in Step S907) (an update determining unit). Specifically, the notification determining unit 119 transmits a request by a GET method conforming to Hyper Text Transfer Protocol (HTTP) to the content server 206 through the communication control unit 121.

Figures 10, 11:
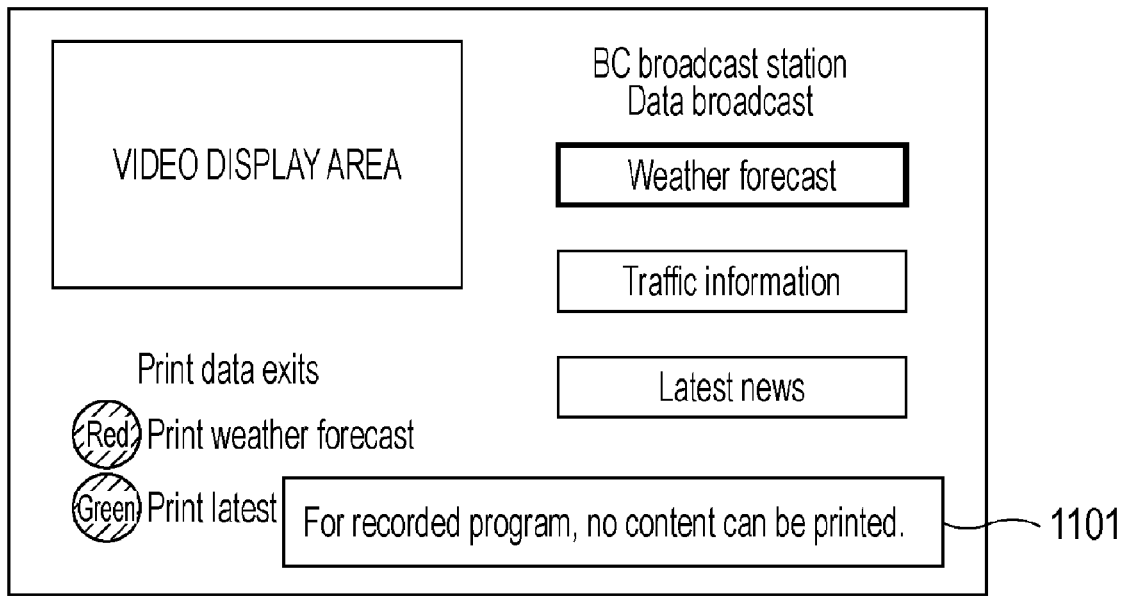
FIG. 10 shows an example of a request used for determining whether a print content item is updated.
FIG. 11 illustrates an example of the print inconsistency message displayed along with a data broadcast screen displayed in a video display unit in a DTV according to the second exemplary embodiment of the present invention.

FIG. 10 shows an example of a request used for determining whether a print content item is updated. In the example in FIG. 10, the broadcast end time of a recorded program that is being viewed is Wed. 25 Jun. 2007 21:55:00. The HTTP request includes an "if-Modified-Since" field including the broadcast end time.

The response to this HTTP request is "404 Not Found" if the print content item does not exist because it has been deleted and is "200 OK" if the print content item is updated. According to the second exemplary embodiment, the deletion of the print content item is processed as one type of the update for simplicity. If the print content item is not updated, the response to this HTTP request is "304 Not Modified".

When it is not necessary to actually acquire a print content item, a HEAD method may be used, instead of the GET method.

If the print content item is not updated (that is, the notification determining unit 119 receives "304 Not Modified" through the communication control unit 121), the notification process is terminated without performing Step S910. Accordingly, the print inconsistency message is not displayed in the second exemplary embodiment if the print content item is not updated. If the print content item is updated (that is, the notification determining unit 119 receives "404 Not Found" or "200 OK" through the communication control unit 121), the process goes to Step S910.

In Step S910, the notification determining unit 119 requests the graphic generating unit 110 to display the print inconsistency message in accordance with the determination result of the print content item in Step S909. The graphic generating unit 110 generate graphic data to be displayed on the "print inconsistency message" screen in response to the request from the notification determining unit 119, and the generated graphic data is displayed in the video display unit 108 via the superimposing unit 105 and the display control unit 106.

FIG. 8 and FIG. 11 illustrate examples of the print inconsistency message superimposed on the data broadcast screen displayed in the video display unit 108. If the notification determining unit 119 receives "404 Not Found", a print inconsistency message 1101 is displayed (refer to FIG. 11). The print inconsistency message 1101 indicates to the user that no print content item can be printed in the case of a recorded program. If the notification determining unit 119 receives "200 OK", the print inconsistency message 801 is displayed (refer to FIG. 8). The print inconsistency message 801 indicates to the user that a print content item different from that displayed while broadcasting the program can be printed in the case of a recorded program. In other words, the content of the print inconsistency message is varied depending on whether the print content item is deleted. Consequently, the user can correctly recognize the state of the print content item.

The time used in the "if-Modified-Since" field is not limited to the broadcast end time of the recorded program that is being viewed. For example, if the information about the broadcast start time and the duration of a data broadcast print service is included in the program information acquired from the P-TS, the notification determining unit 119 may calculate the end time of the print service (the broadcast end time of the print information) in Step S907. In this case, the broadcast end time of the print information is included in the "if-Modified-Since" field. This allows accurate determination of whether the print content item is updated.

The notification process shown in FIG. 9 is repeatedly performed at appropriate timing. This allows the print inconsistency message to be displayed if the print content item is updated while a recorded program being viewed even when the print content item has not been updated at the time when the viewing of the recorded program is started.

As described above, according to the second exemplary embodiment, the DTV 100 does not display the print inconsistency message if a print content item transmitted from an external server is not deleted or updated.

Accordingly, the user can correctly recognize whether a desired print content item can be acquired while viewing a recorded program.

Third Exemplary Embodiment

Figure 12:
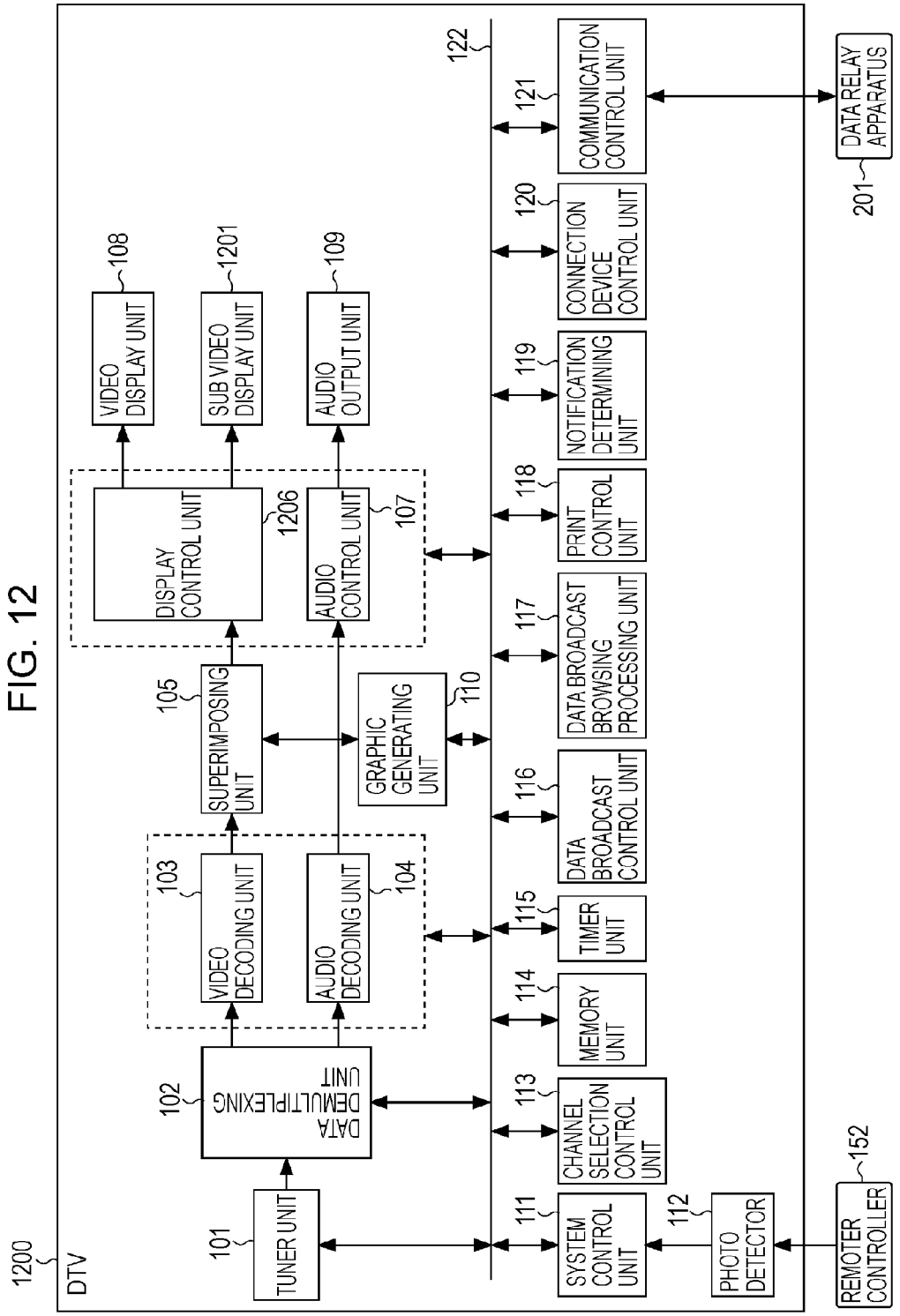
FIG. 12 is a block diagram showing an example of the configuration of a DTV according to a third exemplary embodiment of the present invention.
Figure 13:
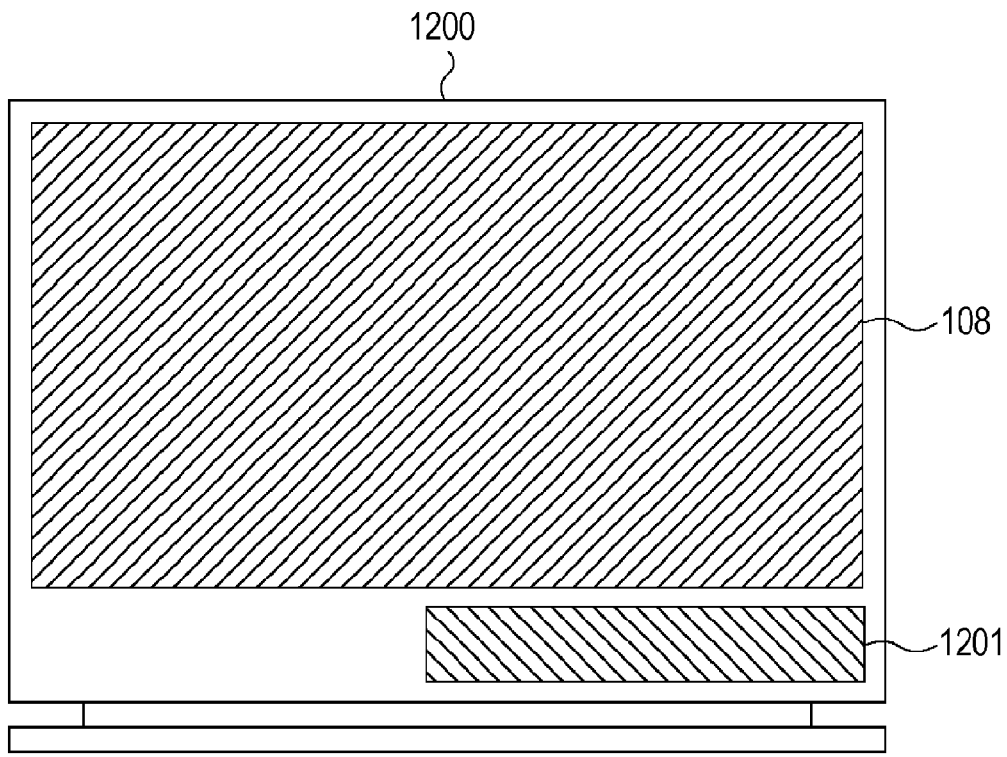
FIG. 13 is an external front view of the DTV according to the third exemplary embodiment of the present invention.

According to a third exemplary embodiment of the present invention, a DTV 1200 shown in FIG. 12 is used as a broadcast receiving apparatus, instead of the DTV 100 according to the first exemplary embodiment. The same reference numerals are used in FIG. 12 to identify the same components shown in FIG. 1 and a description of such components is omitted herein. FIG. 13 is an external front view of the DTV 1200. The third exemplary embodiment differs from the first exemplary embodiment in the following two points.

First, the DTV 1200 according to the third exemplary embodiment includes a sub video display unit 1201 (a second display unit), in addition to the video display unit 108 (a first display unit).

Next, the unit where the print inconsistency message is displayed is switched between the video display unit 108 and the sub video display unit 1201 depending on an operation of the user.

Figure 14:
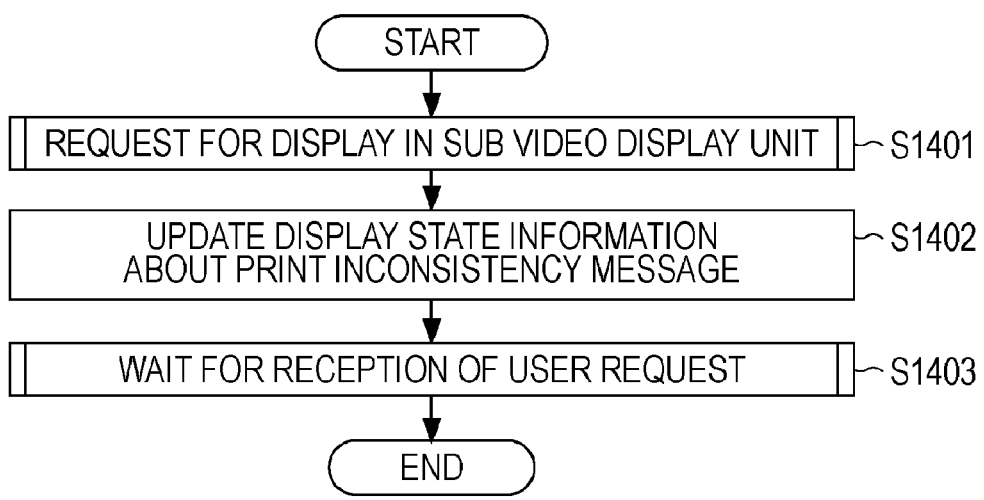
FIG. 14 is a flowchart showing in detail Step S707 in FIG. 7.
Figure 15:
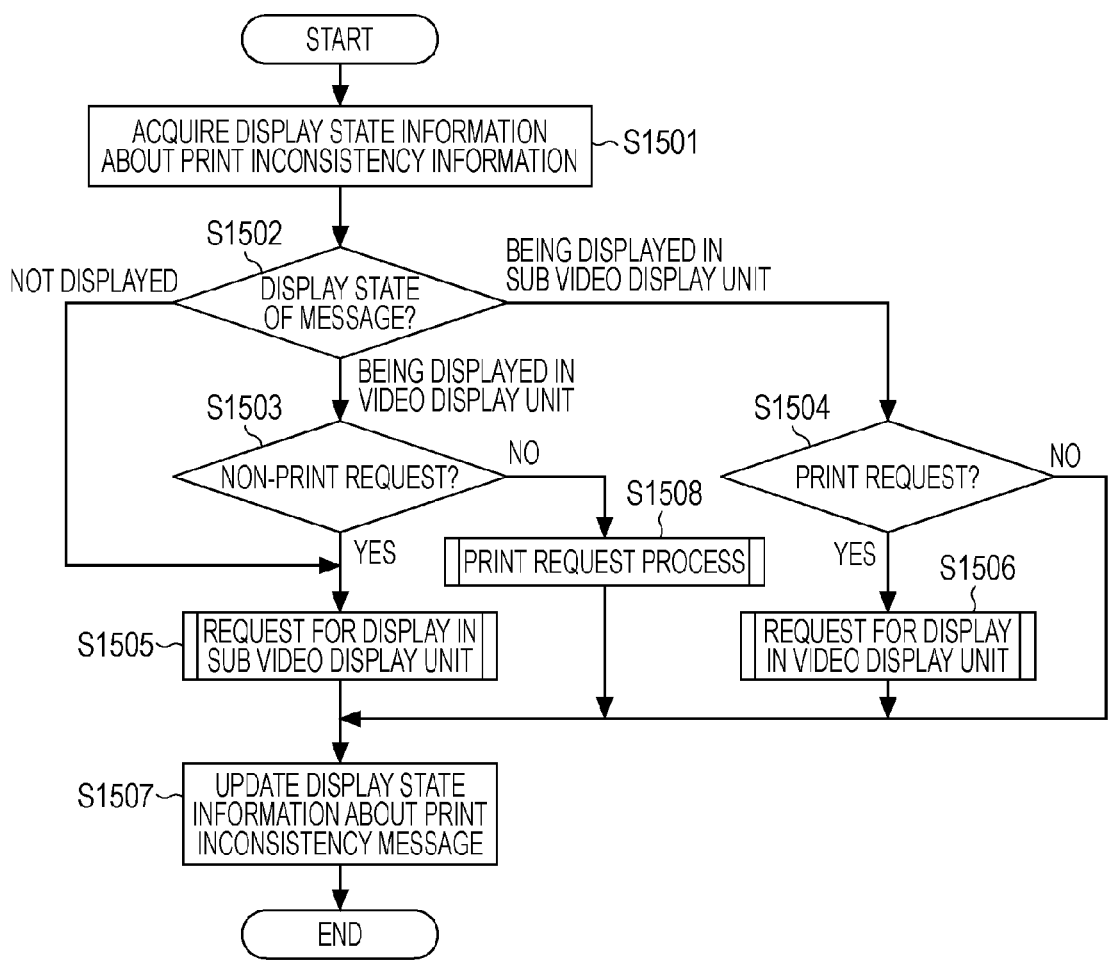
FIG. 15 is a flowchart showing an example of a process performed by a notification determining unit in the DTV according to the third exemplary embodiment when the DTV receives a user request after the steps in FIG. 14 are finished.

FIG. 14 is a flowchart showing in detail Step S707 in FIG. 7. FIG. 15 is a flowchart showing an example of a process performed by the notification determining unit 119 when the DTV 1200 receives a user request after the steps in FIG. 14 are finished. With these steps and process, it is possible to determine whether the print inconsistency message is displayed in the video display unit 108 or the sub video display unit 1201 on the basis of the display state and the user's operation and to display the print inconsistency message in the video display unit 108 or the sub video display unit 1201.

The flowchart shown in FIG. 14 will now be described.

In Step S1401, the notification determining unit 119 requests the graphic generating unit 110 to display the print inconsistency message in the sub video display unit 1201. The graphic generating unit 110 generates graphic data to be displayed on the "print inconsistency message" screen in response to the request from the notification determining unit 119, and the generated graphic data is supplied to the sub video display unit 1201 through the superimposing unit 105 and the display control unit 106.

In Step S1402, the notification determining unit 119 updates display state information about the print inconsistency message held in the memory unit 114. The display state information about the print inconsistency message is information indicating whether the print inconsistency message is currently displayed and, if the print inconsistency message is displayed, whether the print inconsistency message is displayed in the video display unit 108 or the sub video display unit 1201.

In Step S1403, the notification determining unit 119 requests the system control unit 111 to notify the notification determining unit 119 of information about any user's operation with the remote controller 152 and waits for reception of a user request.

Figure 16:
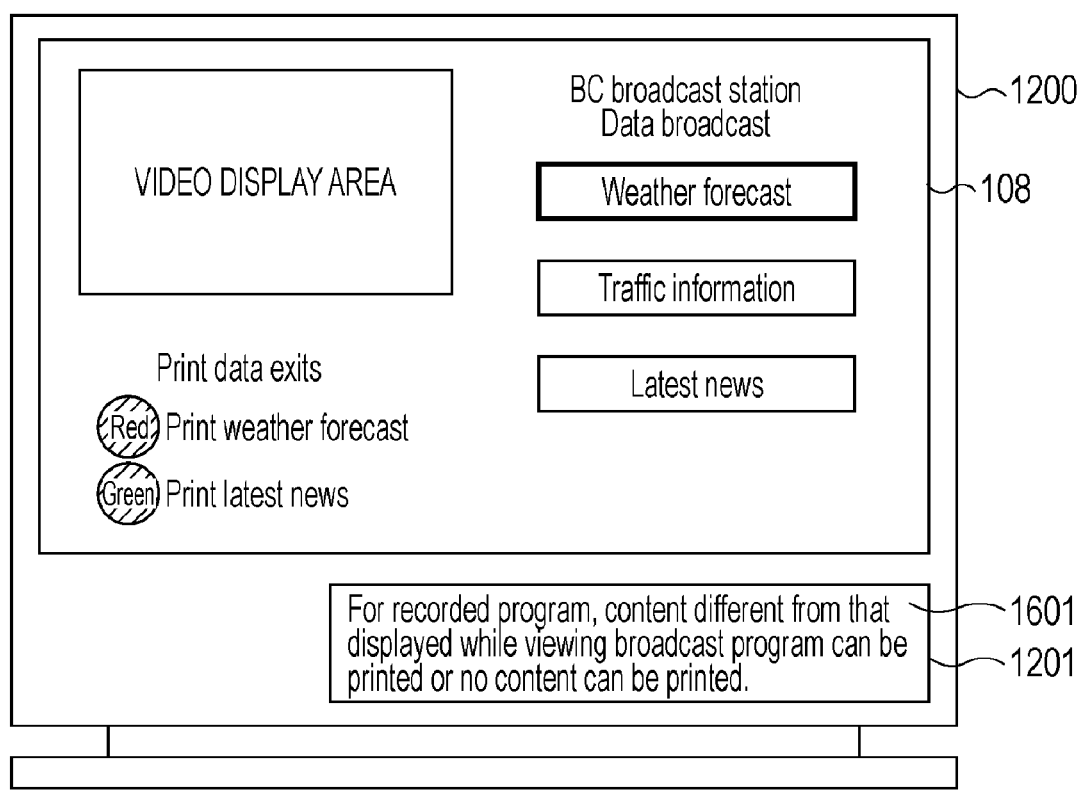
FIG. 16 illustrates an example of the display screens in a video display unit and a sub video display unit after the steps in FIG. 14 are finished.

FIG. 16 illustrates an example of the display screens in the video display unit 108 and the sub video display unit 1201 after the steps in FIG. 14 are finished. In the example in FIG. 16, the data broadcast screen is displayed in the video display unit 108 and a print inconsistency message 1601 is displayed in the sub video display unit 1201.

The flowchart shown in FIG. 15 will now be described. The process in FIG. 15 is started when the notification determining unit 119 receives a user request from the remote controller 152 through the system control unit 111.

In Step S1501, the notification determining unit 119 acquires the display state information about the print inconsistency message from the memory unit 114.

In Step S1502, the notification determining unit 119 determines the current display state of the print inconsistency message on the basis of the acquired display state information about the print inconsistency message. If the notification determining unit 119 determines that the print inconsistency message is not currently displayed, the process goes to Step S1505. If the notification determining unit 119 determines that the print inconsistency message is displayed in the video display unit 108, the process goes to Step S1503. If the graphic generating unit 110 determines that the print inconsistency message is displayed in the sub video display unit 1201, the process goes to Step S1504.

In Step S1503, the notification determining unit 119 determines whether the user request received through the system control unit 111 is a non-print request. If the notification determining unit 119 determines that the user request is a non-print request, the process goes to Step S1505. Otherwise, the process goes to Step S1508. According to the third exemplary embodiment, when the cursor key 303 on the remote controller 152 is operated or the Enter key 304 on the remote controller 152 is pressed, the notification determining unit 119 determines that the user request is a non-print request.

In Step S1505, the notification determining unit 119 requests the graphic generating unit 110 to display the print inconsistency message in the sub video display unit 1201.

The notification determining unit 119 also requests the graphic generating unit 110 to terminate the display of the print inconsistency message in the video display unit 108.

In Step S1504, the notification determining unit 119 determines whether the user request received through the system control unit 111 is a print request. If the notification determining unit 119 determines that the user request is a print request, the process goes to Step S1506. Otherwise, the process goes to Step S1507. According to the third exemplary embodiment, when the Red key or the Green key in the color keys 306 on the remote controller 152 is pressed, the notification determining unit 119 determines that the user request is a print request.

In Step S1506, the notification determining unit 119 requests the graphic generating unit 110 to display the print inconsistency message in the video display unit 108. The notification determining unit 119 also requests the graphic generating unit 110 to terminate the display of the print inconsistency message in the sub video display unit 1201.

In Step S1507, the notification determining unit 119 updates the display state information about the print inconsistency message held in the memory unit 114.

In Step 1508, the notification determining unit 119 instructs the data broadcast browsing processing unit 117 to perform the print request process (refer to FIG. 5C). Specifically, according to the third exemplary embodiment, when the system control unit 111 receives a print request (a first print request) (a third receiving unit), the print inconsistency message is displayed in the video display unit 108 but the print request process is not performed at this time. When the system control unit 111 receives a print request again (a second print request) with the print inconsistency message displayed in the video display unit 108, the print request process is performed and the print control unit 118 instructs the printing apparatus 204 to perform the printing process in response to a request from the data broadcast browsing processing unit 117. Accordingly, the user can recognize again that the desired print content item cannot possibly be acquired before the printing is actually performed. The second print request is not necessarily the same as the first print request. For example, the video display unit 108 may display a message, such as "Print? (1:Yes 2:No)", and the notification determining unit 119 may determine a user's operation with the "1" key in the numeric keys 307 as the second print request.

Figure 17:
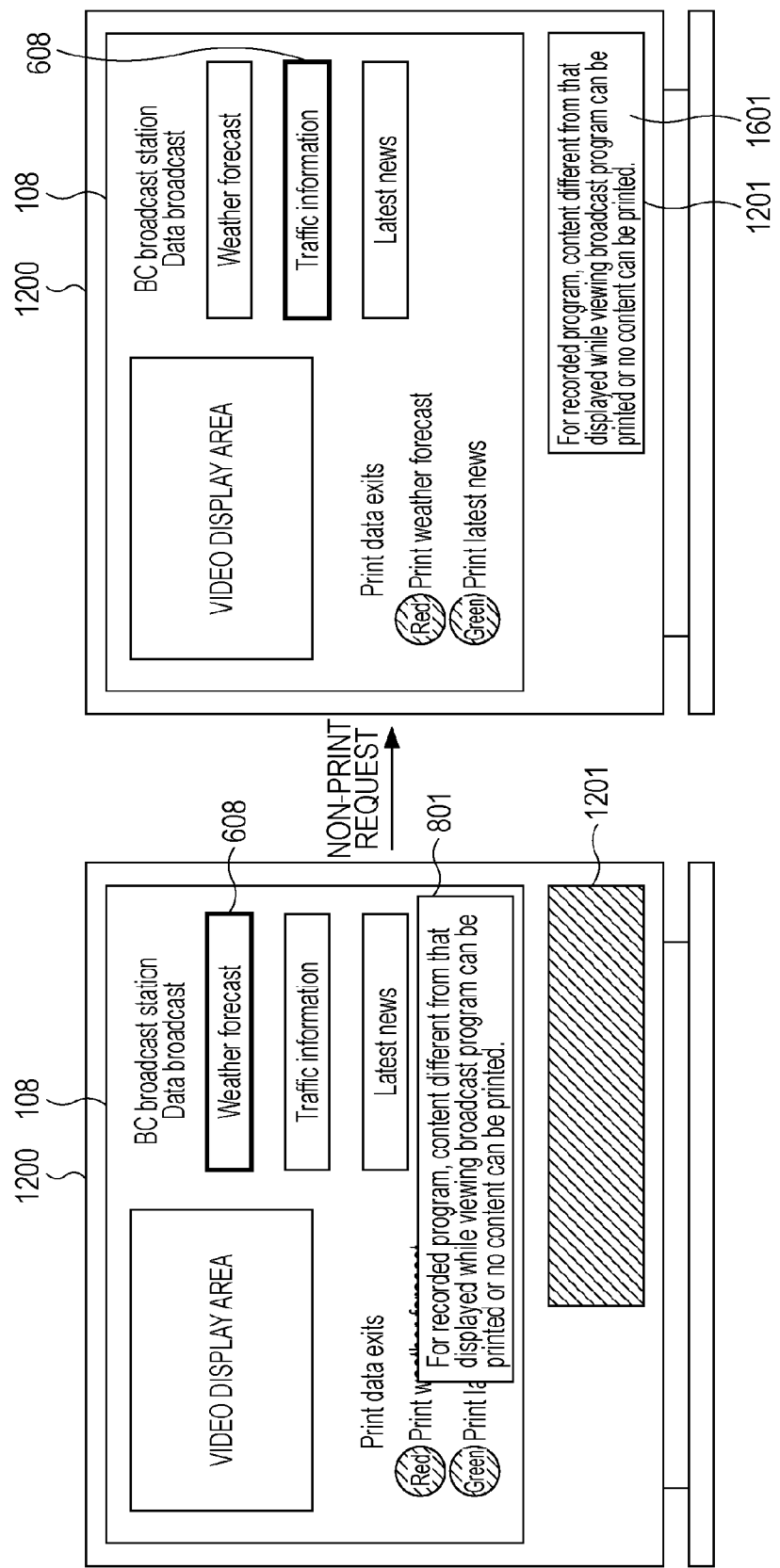
FIG. 17 illustrates an example of display transition of the print inconsistency message between the video display unit and the sub video display unit in response to the process in FIG. 15.
Figure 18:
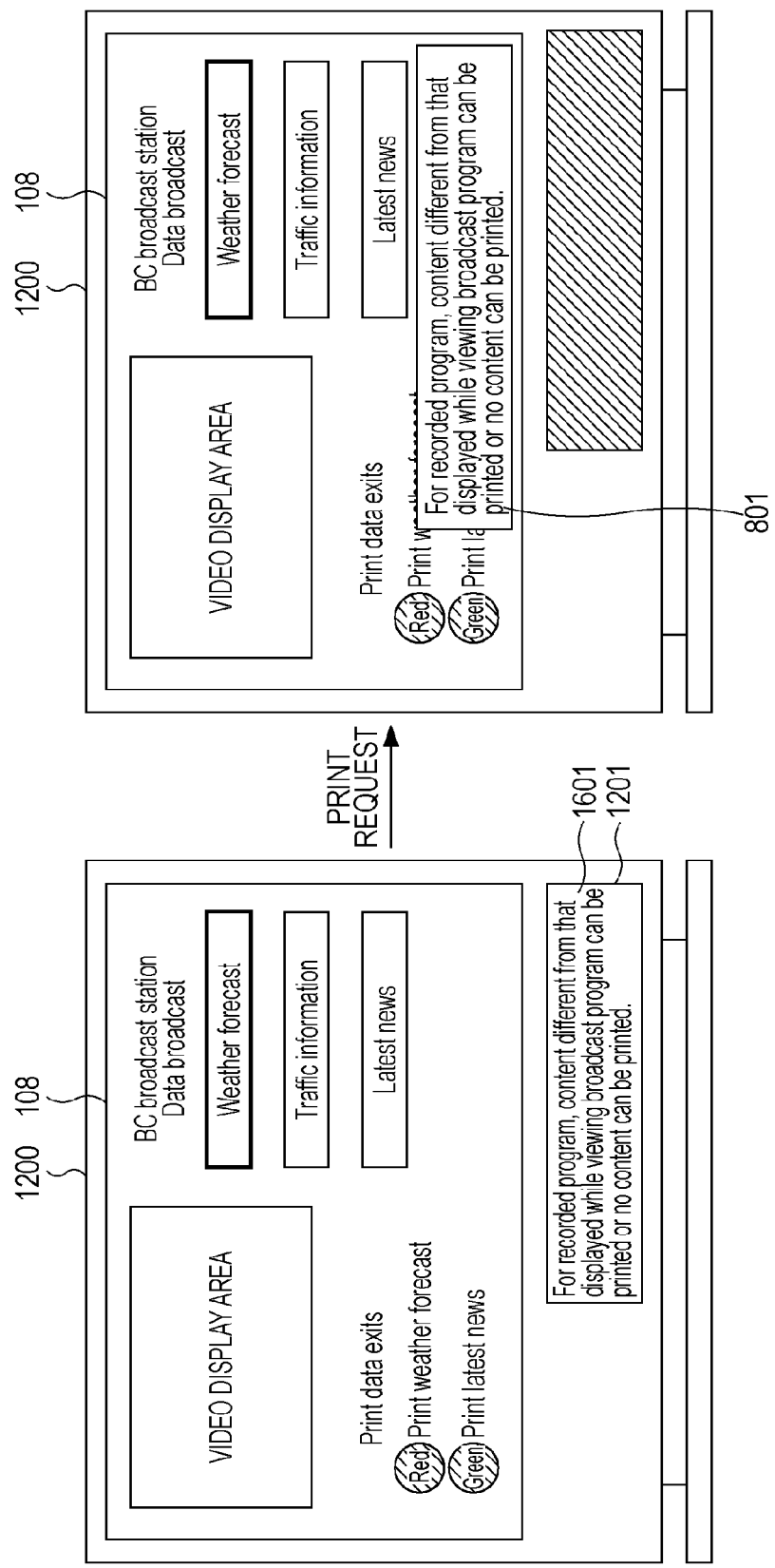
FIG. 18 illustrates another example of display transition of the print inconsistency message between the video display unit and the sub video display unit in response to the process in FIG. 15.

FIG. 17 and FIG. 18 illustrate examples of display transition of the print inconsistency message between the video display unit 108 and the sub video display unit 1201 in response to the process in FIG. 15.

FIG. 17 illustrates an example of the display transition when a non-print request is submitted, for example, a request to shift the focus 608 is submitted with the cursor key 303 while the print inconsistency message 801 is displayed in the video display unit 108. FIG. 18 illustrates an example of the display transition when a print request is submitted, for example, a print request is submitted with the Red key or the Green key while the print inconsistency message 1601 is displayed in the sub video display unit 1201.

The third exemplary embodiment may be modified such that the DTV 1200 does not include the sub video display unit 1201. In this case, the notification determining unit 119 does not give notification with the print inconsistency message before the notification determining unit 119 receives a print request through the system control unit 111. When the notification determining unit 119 receives a print request again after the print inconsistency message is displayed, the print request process is performed, as described above in Step S1508.

As described above, according to the third exemplary embodiment, the notification determining unit 119 does not superimpose the print inconsistency message on the video output in the video display unit 108 before the notification determining unit 119 receives a print request. When the notification determining unit 119 receives a print request again after the print inconsistency message is superimposed on the video, the notification determining unit 119 causes the data broadcast browsing processing unit 117 to perform the print request process.

Consequently, it is possible to suppress a reduction in the legibility of the data broadcast screen by the print inconsistency message while a recorded program is being viewed.

Fourth Exemplary Embodiment

According to a fourth exemplary embodiment, an example of the configuration allowing for a situation in which a recorded program is being viewed while the corresponding program is being broadcasted is described. Such a situation typically occurs during so-called time-shift viewing. For example, the fourth exemplary embodiment is effective when a recorded program is viewed several minutes after the corresponding program is broadcasted in real time because the print content item is possibly not updated in this case.

Since the configurations of the DTV 100, the print system 250, and the remote controller 152 according to the fourth exemplary embodiment are the same as the ones according to the first exemplary embodiment, a description of the configurations is omitted herein (refer to FIGS. 1 to 3).

Figure 19:
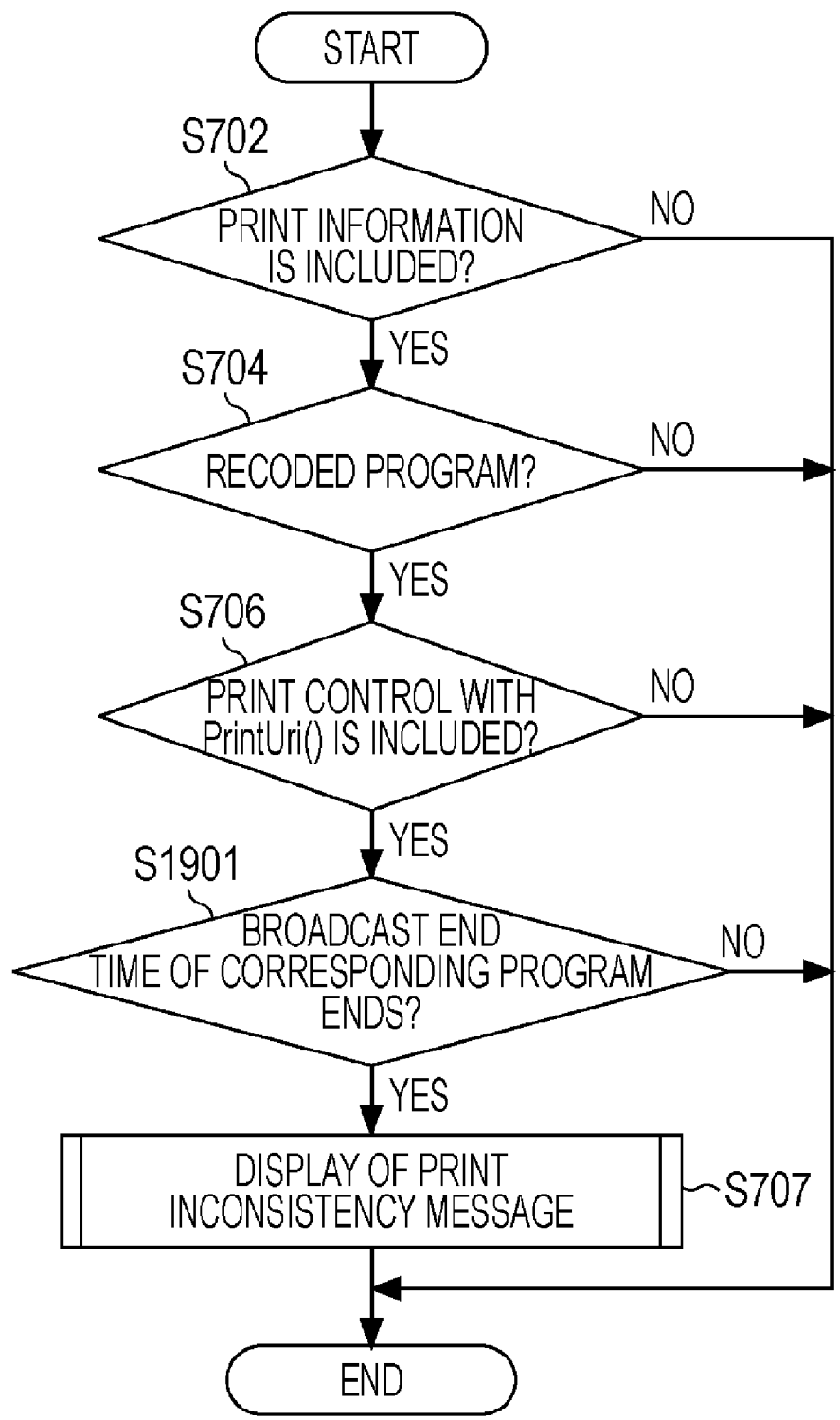
FIG. 19 is a flowchart showing an example of a notification process of the print inconsistency message according to a fourth exemplary embodiment of the present invention.

FIG. 19 is a flowchart showing an example of a notification process of the print inconsistency message according to the fourth exemplary embodiment. The notification process in FIG. 19 is started in parallel with the processes shown in FIGS. 5A to 5C after Step S502 in FIG. 5 is finished. The same reference numerals are used in FIG. 19 to identify the same steps shown in FIG. 7 and a description of such steps is omitted herein.

Referring to FIG. 19, in Step S1901, the notification determining unit 119 determines whether the broadcast end time of the program corresponding to a broadcast signal that is being played back ends. The broadcast end time is recorded in the recording apparatus 203. The broadcast end time can be calculated on the basis of the broadcast time information acquired from the partial transport time descriptor in the SIT included in the P-TS, as described above in the second exemplary embodiment. If the notification determining unit 119 determines that the broadcast end time ends, the process goes to Step S707. If the notification determining unit 119 determines that the broadcast end time does not end, the notification process is terminated without the notification by using the print inconsistency message.

As described above, according to the fourth exemplary embodiment, the notification by using the print inconsistency message is not performed before the broadcast end time of the corresponding program ends even while a recorded program is being viewed.

Accordingly, the user can accurately determine whether a desired print content item can be acquired while viewing a recorded program.

Exemplary Modification

Figure 20:
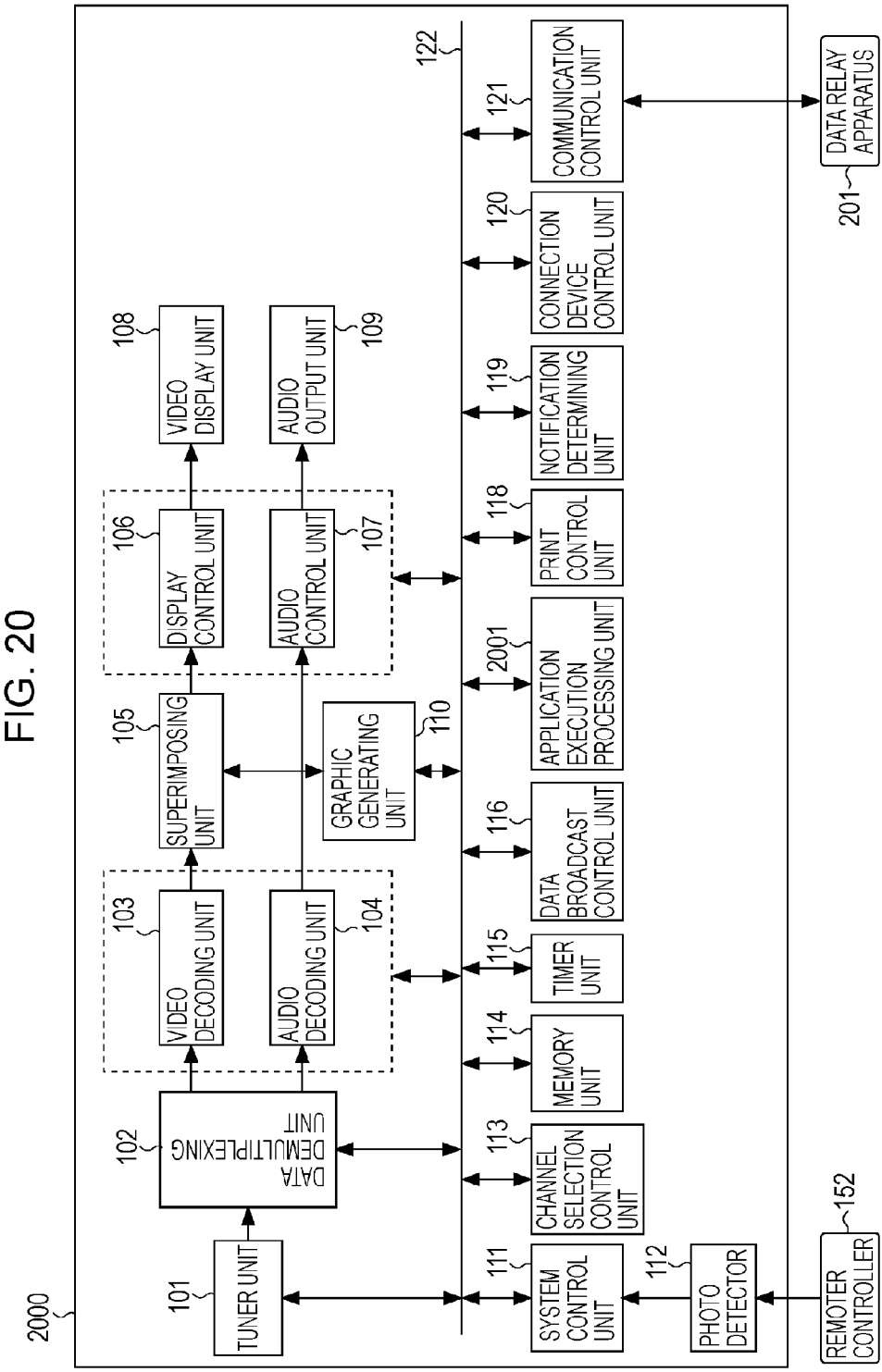
FIG. 20 is a block diagram showing an example of the configuration of a DTV according to a modification of the first to fourth embodiments of the present invention.

The data broadcast of declarative data (content-display type) based on BML data is assumed in the above exemplary embodiments of the present invention. However, the above exemplary embodiments of the present invention is also applicable to data broadcast of procedural data (program-execution type). A DTV 2000 shown in FIG. 20 results from modification of the DTV 100 in FIG. 1 so as to support the data broadcast of procedural data. The same concept is applicable to the DTV 1200 shown in FIG. 12. The same reference numerals are used in FIG. 20 to identify the same components shown in FIG. 1 and a description of such components is omitted herein.

The DTV 2000 includes an application execution processing unit 2001. The application execution processing unit 2001 has a function of executing an application program that is received through the antenna 200 and is acquired by the data broadcast control unit 116. With this configuration, the data broadcast print service realized by the data broadcast browsing processing unit 117 and the BML data in the above exemplary embodiments can be realized by a print application program executable in the application execution processing unit 2001.

For example, program code executing the function corresponding to the control by the getBrowserSupport( ), the printFile( ), or the printUri( ) function according to the first exemplary embodiment is included in the print application program. This allows the notification operation of the print inconsistency message to be realized in the data broadcast of the procedural data in the same manner as in the data broadcast of the declarative data based on the BML data.

Other Embodiments

The present invention can be embodied by supplying a recording medium storing software program code realizing the functions according to the above embodiments to a system or an apparatus, the computer (or central processing unit (CPU) or micro processing unit (MPU)) in which system or apparatus reads out and executes the program code stored in the recording medium. In this case, the present invention is embodied by the program code itself read out from the recording medium. The present invention is applicable to the recording medium storing the program code. The recording medium supplying the program code may be, for example, a flexible disk, a hard disk, an optical disk, a magneto-optical disk (MO), a compact disk-read only memory (CD-ROM), a compact disc recordable (CD-R), a magnetic tape, a nonvolatile memory card, or a ROM.

The computer that executes the readout program code realizes the functions of the embodiments described above. In addition, the operating system (OS) or the like running on the computer may execute all or part of the actual processing on the basis of instructions in the program code to realize the functions of the embodiments described above.

Alternatively, after the program code read out from the recording medium has been written in a memory that is provided in a function expansion board included in the computer or in a function expansion unit connected to the computer, the CPU or the like in the function expansion board or the function expansion unit may execute all or part of the actual processing on the basis of instructions in the program code to realize the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-233384 filed Sep. 7, 2007, which is hereby incorporated by reference herein in its entirety.

What is claimed is:

1. A broadcast receiving apparatus comprising:
    a first receiving unit configured to receive a broadcast signal being broadcasted including print information;
    a second receiving unit configured to receive a broadcast signal recorded with a recording apparatus including print information;
    a playback outputting unit configured to play back the broadcast signal received by the first receiving unit or the second receiving unit to output a video;
    a reception determining unit configured to determine whether the broadcast signal played back by the playback outputting unit is received by the first receiving unit or the second receiving unit;
    a print information determining unit configured to determine whether the print information included in the broadcast signal that is being played back includes first instructing information to instruct printing of print content by acquiring the print content from an external server via a network or includes second instructing information to instruct printing of the print content received via the print information; and
    a notification unit configured to notify a user that there is a possibility that the print content corresponding to the print information for the previous broadcast signal cannot be acquired with the print information included in the broadcast signal that is being played back if the print information determining unit determines that the print information included in the broadcast signal that is being played back includes the first instructing information and the reception determining unit determines that the broadcast signal that is being played back is received by the second receiving unit.

2. The broadcast receiving apparatus according to claim 1, further comprising an update determining unit configured to determine whether the print content item indicated by the first instructing information is updated after a predetermined time,
    wherein the notification unit gives no the notification if the update determining unit determines that the print content item indicated by the first instructing information is not updated.

3. The broadcast receiving apparatus according to claim 2, wherein the predetermined time is a broadcast end time of a program corresponding to the broadcast signal that is being played back.

4. The broadcast receiving apparatus according to claim 2, wherein the predetermined time is a broadcast end time of the print information included in the broadcast signal that is being played back.

5. The broadcast receiving apparatus according to claim 1, wherein the notification unit gives no the notification if a broadcast end time of a program corresponding to the broadcast signal that is being played back does not end.

6. The broadcast receiving apparatus according to claim 1, wherein the notification unit gives a notification by superimposing a message on a video output from the playback outputting unit.

7. The broadcast receiving apparatus according to claim 6, further comprising:
    a third receiving unit configured to receive a print request requesting execution of a printing process based on the print information; and
    an instructing unit configured to instruct a printing apparatus to execute the printing process based on the print information,
    wherein the notification unit prevents the message from being superimposed on the video output from the playback outputting unit before the third receiving unit receives the print request, and wherein the instructing unit issues the instruction if the third receiving unit receives the print request again after the notification unit superimposes the message on the video output from the playback outputting unit.

8. The broadcast receiving apparatus according to claim 6, further comprising:
a first display unit in which the video output from the playback outputting unit is displayed;
a second display unit;
a third receiving unit configured to receive a print request requesting execution of a printing process based on the print information;
an instructing unit configured to instruct a printing apparatus to execute the printing process based on the print information; and
an outputting unit configured to output the message to be displayed in the second display unit,
wherein the notification unit prevents the message from being superimposed on the video output from the playback outputting unit and causes the outputting unit to output the message before the third receiving unit receive the print request and superimposes the message on the video output from the playback outputting unit after the third receiving unit receives the print request, and
wherein the instructing unit issues the instruction if the third receiving unit receives the print request again after the notification unit superimposes the message on the video output from the playback outputting unit.

9. The broadcast receiving apparatus according to claim 1, wherein the first instructing information includes a Uniform Resource Identifier of a print content item.

10. The broadcast receiving apparatus according to claim 1, wherein the first instructing information and the second instructing information are functions described in Markup Language.

11. A method of controlling a broadcast receiving apparatus comprising:
receiving a broadcast signal being broadcasted including print information;
receiving a broadcast signal recorded with a recording apparatus including print information;
playing back the broadcast signal that is being broadcasted or the broadcast signal that is recorded in the recording apparatus to output a video;
determining whether a broadcast signal that is being played back is a broadcast signal that is being broadcasted or a broadcast signal that is recorded in the recording apparatus;
determining whether the print information included in the broadcast signal that is being played back includes first instructing information to instruct printing of print content by acquiring the print content from an external server via a network or includes second instructing information to instruct printing of the print content received via the print information; and
notifying a user that there is a possibility that the print content corresponding to the print information for the previous broadcast signal cannot be acquired with the print information included in the broadcast signal that is being played back if it is determined that the print information included in the broadcast signal that is being played back includes the first instructing information and it is determined that the broadcast signal that is being played back is a broadcast signal that is recorded in the recording apparatus and that includes print information.

12. The method of controlling the broadcast receiving apparatus according to claim 11, further comprising the step of determining whether the print content item indicated by the first instructing information is updated after a predetermined time,
wherein the notifying gives no the notification if it is determined that the print content item indicated by the first instructing information is not updated.

13. The method of controlling the broadcast receiving apparatus according to claim 12, wherein the predetermined time is a broadcast end time of a program corresponding to the broadcast signal that is being played back.

14. The method of controlling the broadcast receiving apparatus according to claim 12, wherein the predetermined time is a broadcast end time of print information included in the broadcast signal that is being played back.

15. The method of controlling the broadcast receiving apparatus according to claim 11, wherein notifying gives no the notification if a broadcast end time of a program corresponding to the broadcast signal that is being played back does not end.

16. The method of controlling the broadcast receiving apparatus according to claim 11, wherein the notifying gives a notification by superimposing a message on the output video.

17. The method of controlling the broadcast receiving apparatus according to claim 16, further comprising the steps of:
receiving a print request requesting execution of a printing process based on the print information; and
instructing a printing apparatus to execute the printing process based on the print information,
wherein the notifying prevents the message from being superimposed on the output video before the print request is received, and
wherein the instructing issues the instruction if the print request is received again after the notifying superimposes the message on the output video.

18. The method of controlling the broadcast receiving apparatus according to claim 16, further comprising the steps of:
receiving a print request requesting execution of a printing process based on the print information;
instructing a printing apparatus to execute the printing process based on the print information; and
outputting the message so as to be displayed in a second display unit different from a first display unit in which the output video is displayed,
wherein the notifying does not superimpose the message on the output video and causes the message to be output before the print request is received and superimposes the message on the output video after the print request is received, and
wherein the instructing issues the instruction if the print request is received again after the notifying superimposes the message on the output video.

19. The method of controlling the broadcast receiving apparatus according to claim 11, wherein the first instructing information includes a Uniform Resource Identifier of a print content item.

20. The method of controlling the broadcast receiving apparatus according to claim 11, wherein the first instructing information and the second instructing information are functions described in Markup Language.

* * * * *